United States Patent
Kumar et al.

(10) Patent No.: US 12,393,071 B2
(45) Date of Patent: Aug. 19, 2025

(54) COVER GLASS WITH REINFORCEMENT FOR DISPLAY OR TOUCH PANELS

(71) Applicant: CORNING INCORPORATED, Corning, NY (US)

(72) Inventors: Atul Kumar, Horseheads, NY (US); Cheng-Chung Li, Snohomish, WA (US); Jinfa Mou, Painted Post, NY (US); Stephane Poissy, Brunoy (FR)

(73) Assignee: CORNING INCORPORATED, Corning, NY (US)

( * ) Notice: Subject to any disclaimer, the term of this patent is extended or adjusted under 35 U.S.C. 154(b) by 1097 days.

(21) Appl. No.: 17/270,305

(22) PCT Filed: Aug. 12, 2019

(86) PCT No.: PCT/US2019/046089
§ 371 (c)(1),
(2) Date: Feb. 22, 2021

(87) PCT Pub. No.: WO2020/041015
PCT Pub. Date: Feb. 27, 2020

(65) Prior Publication Data
US 2021/0255500 A1   Aug. 19, 2021

Related U.S. Application Data

(60) Provisional application No. 62/719,836, filed on Aug. 20, 2018.

(51) Int. Cl.
*G02F 1/1333* (2006.01)
*B32B 7/12* (2006.01)
(Continued)

(52) U.S. Cl.
CPC .......... *G02F 1/133331* (2021.01); *B32B 7/12* (2013.01); *B32B 17/10036* (2013.01);
(Continued)

(58) Field of Classification Search
None
See application file for complete search history.

(56) References Cited

U.S. PATENT DOCUMENTS 4,455,338 A   6/1984   Henne
4,899,507 A   2/1990   Mairlot
(Continued)

FOREIGN PATENT DOCUMENTS

CN   102566841 A   7/2012
CN   203825589 U   9/2014
(Continued)

OTHER PUBLICATIONS

Ishikawa et al., Touch Mura Mechanisms and Its Suppression by Use of Cover Glass, SID 2013 Digest, pp. 709-712.*
(Continued)

*Primary Examiner* — Eli D. Strah
(74) *Attorney, Agent, or Firm* — William M. Johnson; Payal A. Patel; Frank Brock Riggs

(57) ABSTRACT

Embodiments of a vehicle interior system and methods of forming the same are disclosed. The vehicle interior system includes a base having a curved surface, a display disposed on the curved surface, and a cover glass disposed on the display. The cover glass has a first region including a first major surface, a second major surface opposite the first major surface, and a first thickness defined as a distance between the first major surface and the second major surface. The cover glass also has a second region including the first major surface, a third major surface opposite the first major surface, and a second thickness defined as a distance between the first major surface and the third major surface. The display is attached to the third major surface, and the
(Continued)

second region corresponds to a touch-sensitive region of the display. The second thickness is greater than the first thickness.

20 Claims, 15 Drawing Sheets

(51) Int. Cl.
*B32B 17/10* (2006.01)
*B60K 35/00* (2024.01)
*G06F 3/041* (2006.01)
*B60K 35/60* (2024.01)

(52) U.S. Cl.
CPC .. *B32B 17/10082* (2013.01); *B32B 17/10119* (2013.01); *B32B 17/10761* (2013.01); *B60K 35/00* (2013.01); *G06F 3/041* (2013.01); *B32B 2457/20* (2013.01); *B32B 2605/00* (2013.01); *B60K 35/60* (2024.01); *B60K 2360/785* (2024.01); *G02F 2201/56* (2013.01)

(56) References Cited

U.S. PATENT DOCUMENTS

| | | | |
|---|---|---|---|
| 4,985,099 | A | 1/1991 | Mertens et al. |
| 6,086,983 | A | 7/2000 | Yoshizawa |
| 6,115,086 | A | 9/2000 | Rosen |
| 6,332,690 | B1 | 12/2001 | Murofushi |
| 6,582,799 | B1 | 6/2003 | Brown et al. |
| 7,375,782 | B2 | 5/2008 | Yamazaki et al. |
| 8,344,369 | B2 | 1/2013 | Yamazaki et al. |
| 8,549,885 | B2 | 10/2013 | Dannoux et al. |
| 8,833,106 | B2 | 9/2014 | Dannoux et al. |
| 8,912,447 | B2 | 12/2014 | Leong et al. |
| 9,061,934 | B2 | 6/2015 | Bisson et al. |
| 9,593,042 | B2 | 3/2017 | Hu et al. |
| 9,802,485 | B2 | 10/2017 | Masuda et al. |
| 9,895,975 | B2 | 2/2018 | Lee et al. |
| 9,902,640 | B2 | 2/2018 | Dannoux et al. |
| 9,931,817 | B2 | 4/2018 | Rickerl |
| 10,131,118 | B2 | 11/2018 | Kang et al. |
| 2007/0223121 | A1 | 9/2007 | Franck et al. |
| 2009/0085368 | A1 | 4/2009 | Coffelt et al. |
| 2009/0179840 | A1 | 7/2009 | Tanaka et al. |
| 2009/0185127 | A1 | 7/2009 | Tanaka et al. |
| 2010/0031590 | A1 | 2/2010 | Buchwald et al. |
| 2012/0202030 | A1 | 8/2012 | Kondo et al. |
| 2013/0088441 | A1 | 4/2013 | Chung et al. |
| 2014/0028575 | A1 | 1/2014 | Parivar et al. |
| 2014/0036428 | A1 | 2/2014 | Seng et al. |
| 2015/0246507 | A1 | 9/2015 | Brown et al. |
| 2016/0239132 | A1 | 8/2016 | Lee |
| 2016/0297176 | A1 | 10/2016 | Rickerl |
| 2016/0306451 | A1 | 10/2016 | Isoda et al. |
| 2016/0375808 | A1 | 12/2016 | Etienne et al. |
| 2017/0008377 | A1 | 1/2017 | Fisher et al. |
| 2017/0021661 | A1 | 1/2017 | Pelucchi |
| 2017/0022092 | A1 | 1/2017 | Demartino et al. |
| 2017/0108959 | A1* | 4/2017 | McMillan ................ G02B 1/04 |
| 2017/0150628 | A1 | 5/2017 | Amin et al. |
| 2017/0197870 | A1 | 7/2017 | Finkeldey et al. |
| 2017/0327402 | A1 | 11/2017 | Fujii et al. |
| 2017/0347474 | A1 | 11/2017 | Alonso et al. |
| 2017/0349473 | A1 | 12/2017 | Moriya et al. |
| 2018/0050948 | A1* | 2/2018 | Faik ........................ B60K 35/00 |
| 2018/0111569 | A1 | 4/2018 | Faik et al. |
| 2018/0147985 | A1 | 5/2018 | Brown et al. |
| 2018/0149777 | A1 | 5/2018 | Brown |
| 2018/0149907 | A1 | 5/2018 | Gahagan et al. |
| 2018/0188869 | A1 | 7/2018 | Boggs et al. |
| 2018/0188870 | A1 | 7/2018 | Boggs et al. |
| 2018/0210118 | A1 | 7/2018 | Gollier et al. |
| 2018/0245125 | A1 | 8/2018 | Tsai et al. |
| 2019/0134954 | A1 | 5/2019 | Bauerle et al. |

FOREIGN PATENT DOCUMENTS

| | | | |
|---|---|---|---|
| CN | 104679341 | A | 6/2015 |
| CN | 204463066 | U | 7/2015 |
| CN | 104843976 | A | 8/2015 |
| CN | 105446530 | A | 3/2016 |
| CN | 105511127 | A | 4/2016 |
| CN | 107660181 | A | 2/2018 |
| DE | 4415878 | A1 | 11/1995 |
| DE | 102004022008 | A1 | 12/2004 |
| DE | 102013214108 | A1 | 2/2015 |
| DE | 102016119287 | A1 | 4/2017 |
| EP | 3118174 | A1 | 1/2017 |
| FR | 2918411 | A1 | 1/2009 |
| GB | 2011316 | A | 7/1979 |
| JP | 11-060293 | A | 3/1999 |
| JP | 3059337 | B2 | 7/2000 |
| JP | 2003-500260 | A | 1/2003 |
| JP | 2013-084269 | A | 5/2013 |
| JP | 2015-092422 | A | 5/2015 |
| JP | 5748082 | B2 | 7/2015 |
| JP | 2016-031696 | A | 3/2016 |
| JP | 5976561 | B2 | 8/2016 |
| JP | 2016-173794 | A | 9/2016 |
| JP | 2016-203609 | A | 12/2016 |
| JP | 2016-207200 | A | 12/2016 |
| JP | 2017-076389 | A | 4/2017 |
| KR | 10-2016-0144008 | A | 12/2016 |
| TW | 1434251 | B | 4/2014 |
| WO | 98/01649 | A1 | 1/1998 |
| WO | 00/73062 | A1 | 12/2000 |
| WO | 2007/108861 | A1 | 9/2007 |
| WO | 2012/058084 | A2 | 5/2012 |
| WO | 2014/175371 | A1 | 10/2014 |
| WO | 2015/031594 | A2 | 3/2015 |
| WO | 2016/044360 | A1 | 3/2016 |
| WO | 2016/125713 | A1 | 8/2016 |
| WO | 2016/136758 | A1 | 9/2016 |
| WO | 2016/194916 | A1 | 12/2016 |
| WO | 2016/196531 | A1 | 12/2016 |
| WO | 2016/196546 | A1 | 12/2016 |
| WO | WO-2017155932 | A1 * | 9/2017 ................ B60J 1/00 |
| WO | 2017/205154 | A1 | 11/2017 |
| WO | 2018/005646 | A1 | 1/2018 |
| WO | 2018/009504 | A1 | 1/2018 |
| WO | 2018/075853 | A1 | 4/2018 |
| WO | 2018/081068 | A1 | 5/2018 |
| WO | 2018/125683 | A1 | 7/2018 |

OTHER PUBLICATIONS

Japanese Patent Application No. 2021-508311, Office Action, dated Jul. 5, 2023, 8 pages (4 pages of English Translation and 4 pages of Original Copy); Japanese Patent Office.
Taiwanese Patent Application No. 108129557, Office Action, dated Apr. 29, 2023, 1 page; Taiwanese Patent Office.
International Search Report and Written Opinion of the International Searching Authority; PCT/US19/46089; Mailed Nov. 27, 2019; 9 Pages; European Patent Office.
ASTM, "Standard Test Method for Measurement of Glass Stress-Optical Coefficient", Designation: C770-98 (Reapproved 2013), 8 pages.
International Search Report and Written Opinion of the International Searching Authority; PCT/US2018/012215; mailed on Aug. 1, 2018, 19 pages; European Patent Office.
International Search Report and Written Opinion of the International Searching Authority; PCT/US2018/041062; mailed on Nov. 13, 2018, 13 pages; European Patent Office.
Invitation to Pay Additional Fees of the International Searching Authority; PCT/US2018/012215; mailed on May 11, 2018, 11 pages; European Patent Office.
Patently Mobile, "Tesla's New Infotainment Tablet is Large but Nothing Compared to What Samsung Envisions for Future Digital Dashboards", Available Online at <https://www.patentlymobile.com/2017/07/teslas-new-infotainment-tablet-is-large-but-nothing-compared-to-what-samsung-envisions-for-future-digital-dashboards.html>, Jul. 30, 2017, 4 pages.

(56) References Cited

OTHER PUBLICATIONS

Chinese Patent Application No. 201980061642.3, Office Action dated Dec. 27, 2023, 4 pages (English Translation only), Chinese Patent Office.

* cited by examiner

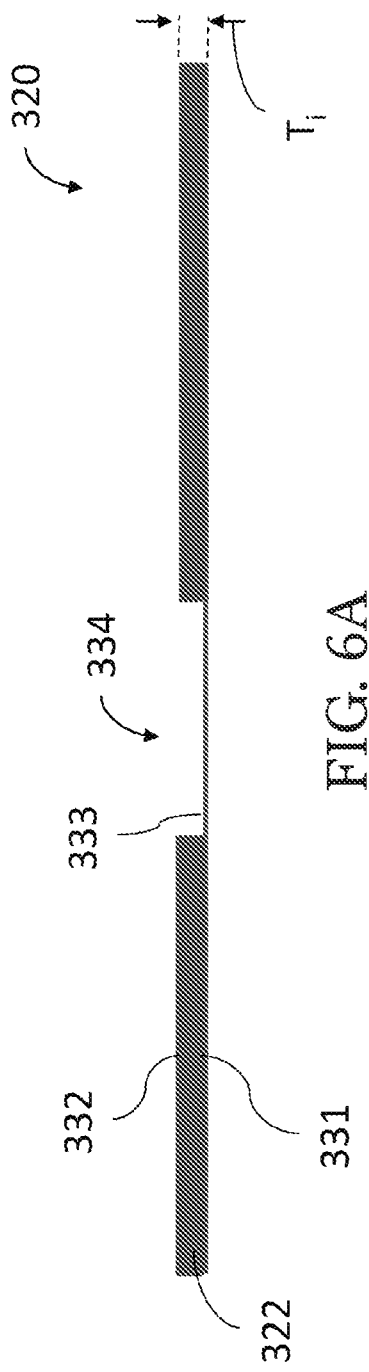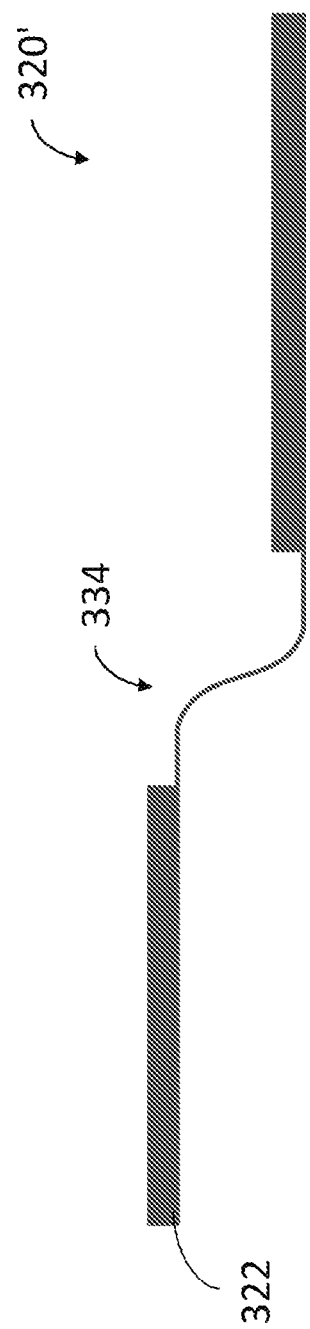
FIG. 6A
FIG. 6B

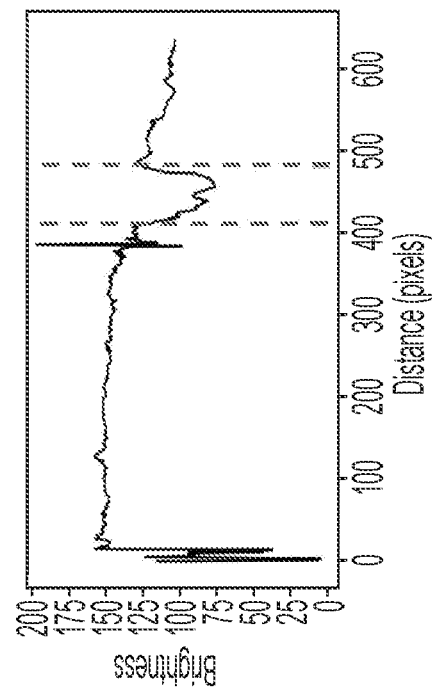
FIG. 8B
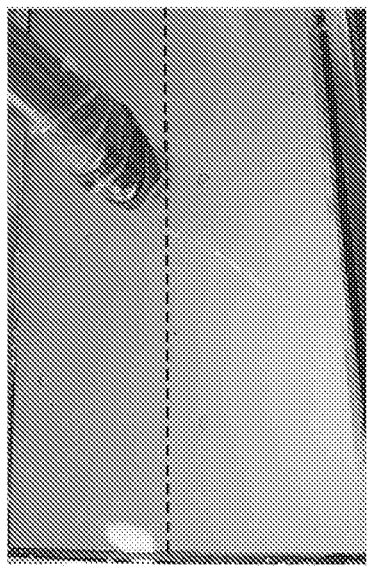
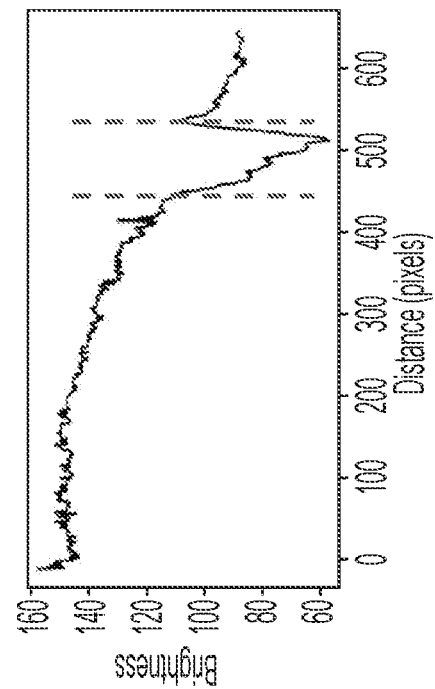
FIG. 8A
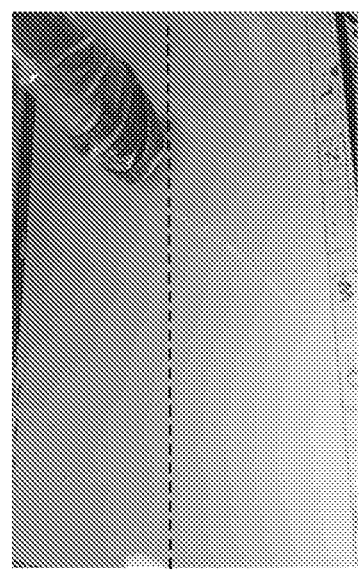

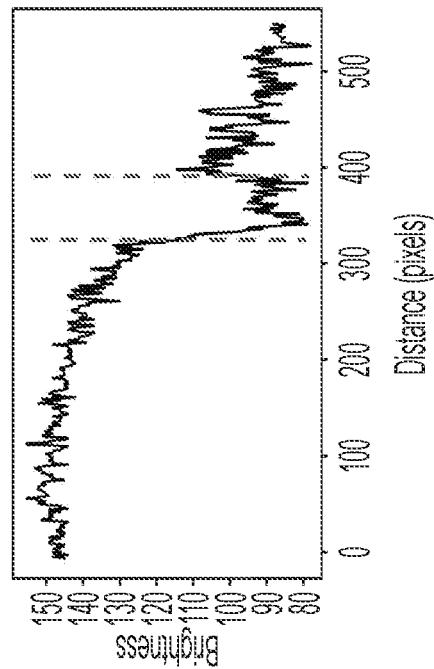
FIG. 8D
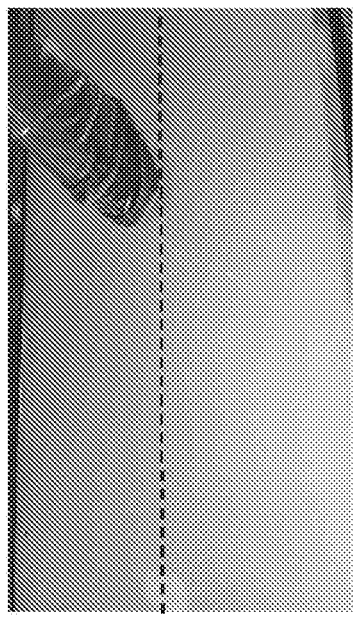
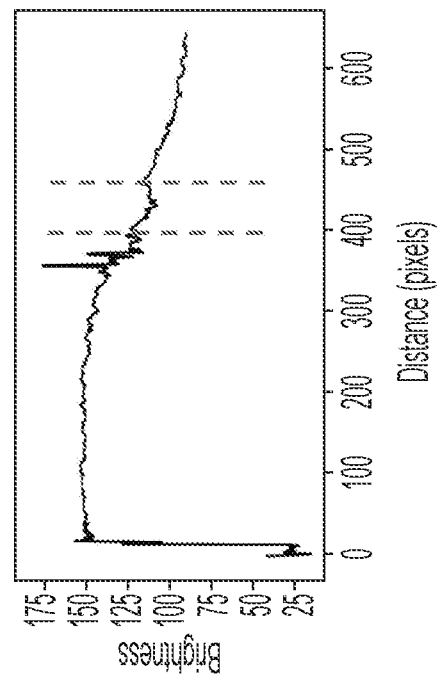
FIG. 8C
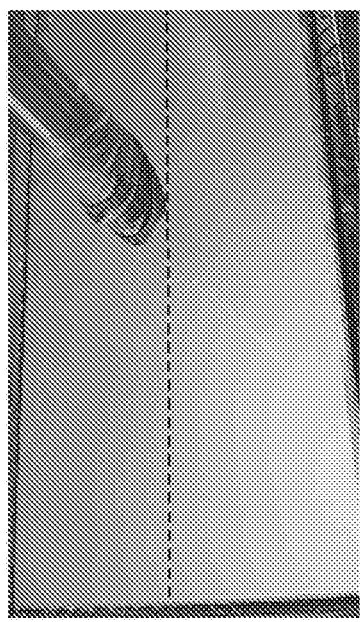

COVER GLASS WITH REINFORCEMENT FOR DISPLAY OR TOUCH PANELS

CROSS-REFERENCE TO RELATED APPLICATIONS

This application is a national stage application under 35 U.S.C. § 371 of International Application No. PCT/US2019/046089, filed on Aug. 12, 2019, which claims benefit of priority under 35 U.S.C. § 119 of U.S. Provisional Application Ser. No. 62/719,836 filed on Aug. 20, 2018 the content of which is relied upon and incorporated herein by reference in its entirety.

TECHNICAL FIELD

The disclosure relates to vehicle interior systems including a cover glass and methods for forming the same, and more particularly to a cover glass that is reinforced for touch panels and displays.

BACKGROUND

Vehicle interiors include curved surfaces and can incorporate displays, touch panels and/or other cover glass components in such curved surfaces. The importance of readability and optical performance of displays in vehicles can be heightened due to compromised environmental conditions when using a display in a vehicle. For example, in-vehicle displays are often fixed relative to the display user (i.e., vehicle passenger) and lighting conditions can be harsh and difficult to control, all of which can result in difficult reading conditions. In addition, there are additional constraints when using in-vehicle displays, including drivers who can only sparingly take their eyes of the road and energy or fuel efficiency concerns of the vehicles that power the displays. Also, from an aesthetic or design perspective, it is often desirable for a display to have uniform and reliable performance, even when receiving touch input from the user.

However, optical performance and readability of these displays can be negatively impacted when touched by the user. When a display device panel is bent or curved, extrinsic stress-retardance can occur and, at appreciable levels, light leakage or degraded optical performance may result in a visible artifact to the user. In the display industry, these visible imperfections are labeled as "mura," based on a Japanese word meaning unevenness or blemish. This mura effect can be present in different types of displays, and is well-known in liquid crystal displays (LCDs), for example. Mura appears as regions of low contrast and irregular luminosity variation (i.e., non-uniform brightness) on the display screen. There are various types of mura, e.g., spot-mura, line-mura, and blob-mura. Mura defects are usually caused by process flaws usually related to cell assembly, which affect the transmission of light through the display. In the context of a touch display or surface touched by a user, a bend or curve induced in the cover glass, underlying adhesive, or display unit is caused by the touch pressure, and can result in stress-retardance in the LCD substrate glasses whose birefringence optically couples with the liquid crystal leading to light leakage in the display device. For example, defect-level objectionable light leakage regions in black (zero grayscale) and low grayscales may exist in curved LCDs, such as near the corners of the display. Accordingly, it would be advantageous to provide articles and methods for mitigating or eliminating light leakage in bent or curved display surfaces. In various embodiments, the methods disclosed herein can minimize or prevent mura in displays, including displays having flat or curved cover glass.

Applicant has identified a need for vehicle interior systems that can incorporate thin, curved glass substrates on touch panel displays with improved optical performance and reduced touch-induced mura.

SUMMARY

One embodiment of the disclosure relates to a vehicle interior system including a base having a curved surface, a display disposed on the curved surface, and a cover glass disposed on the display. The cover glass includes a first region having a first major surface, a second major surface opposite the first major surface, and a first thickness defined as a distance between the first major surface and the second major surface. The cover glass further includes a second region including the first major surface, a third major surface opposite the first major surface, and a second thickness defined as a distance between the first major surface and the third major surface. The display is attached to the third major surface, and the second region corresponds to a touch-sensitive region of the display. The second thickness is greater than the first thickness. An aspect of some embodiments of this disclosure provides the above vehicle interior system where the cover glass further includes, in the second region, a first glass substrate having the first major surface and a second glass substrate having the third major surface.

Another embodiment of this disclosure relates to a vehicle interior system including a display module having a display and a touch panel, a cover glass disposed on the display module, and an interlayer disposed between the display module and the cover glass. The cover glass includes a first major surface, a second major surface opposite the first major surface and attached to the display module, and a first thickness defined as a distance between the first and second major surface. The first major surface is curved, and the vehicle interior system does not exhibit mura when the touch panel registers a touch by a user on the first major surface. In an aspect of some embodiments, the vehicle interior system further includes at least one optical fiber disposed in the interlayer, the optical fiber extending parallel to the second major surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 6A and 6B are cross-sectional views of a flat glass article and a curved glass article, respectively, for a vehicle interior system, according to some embodiments.

FIGS. 8A-8J samples of vehicle interior systems according to some embodiments being subjected to a touch experiment and the measured brightness of the displays of the systems during the experiment.

DETAILED DESCRIPTION

Figure 1:
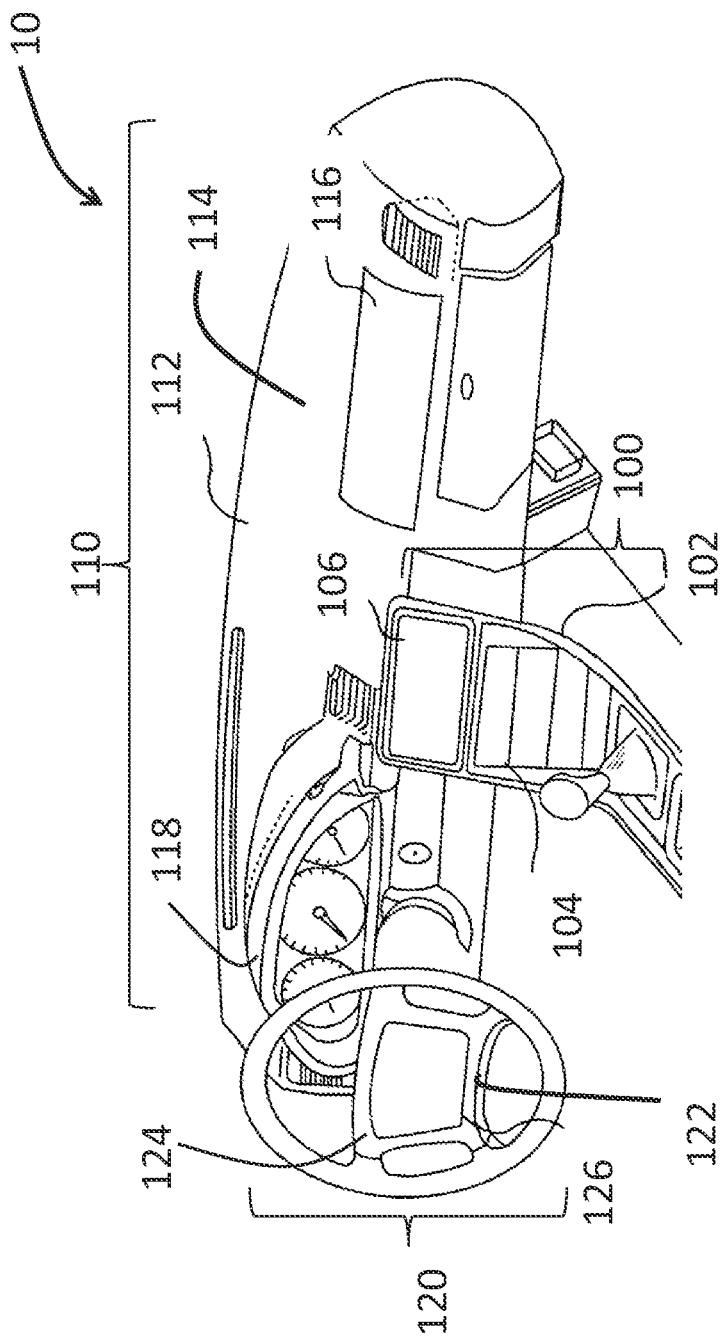
FIG. 1 is a perspective view of a vehicle interior with vehicle interior systems, according to one or more embodiments.

Reference will now be made in detail to various embodiments, examples of which are illustrated in the accompanying drawings.

In general, a vehicle interior system may include a variety of different curved surfaces that are designed to be transparent, such as curved display surfaces and curved non-display glass covers, and the present disclosure provides articles having these curved surfaces and methods for forming these curved surfaces from a glass material. Forming curved vehicle surfaces from a glass material provides a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials. Glass surfaces can also extend beyond the boundaries of displays and touch panels to provide a seamless glass surface over a large surface area. Areas of the glass may also be decorative with a variety of colors, patterns, textures, including an appearance that mimics other materials, such a metal, wood, leather, carbon fiber, or other surfaces.

Glass substrates can provide durable surfaces that are appealing both aesthetically and tactilely. Further, thin glass substrates can reduce vehicle weight for improved energy and fuel efficiency. Thin substrates for cover glass may also have advantages in forming various curved surfaces or curves with small radii of curvature. However, thinner cover glasses may be subject to increased light leakage or mura. For example, when the substrate provides a touch interface for a user, the force of the user's touch may cause the thin cover glass to deflect, generating stress and leading to light leakage, as discussed above.

Accordingly, as will be discussed in more detail below, Applicant has developed a glass article and related manufacturing processes that provide an efficient and cost-effective way to form an article, such as a display for a vehicle interior system, utilizing a cold-bent piece of glass substrate that results in a vehicle interior system relatively free of touch-induced mura. In general, the manufacturing process discussed herein provides for cold-bending of a glass article to a frame using a bonding material. Articles and systems of this disclosure use constructions that reinforce areas of the vehicle interior system intended to receive touch input from a user, which achieves a relatively stiff surface or system stack while using a thin cover glass. The vehicle interior systems disclosed herein include glass articles or glass laminates as a vehicle interior surface. The glass articles or laminates may act as a cover glass for one or more of display, touch panel, or other surface in the vehicle. For example, the vehicle interior system can be all or part of a dashboard, a center console, an instrument cluster, a display, an infotainment module, a steering wheel, a touch panel, and an interior door panel.

As used herein, "glass articles" may refer to monolithic glass-based substrates or glass-based laminates. According to various embodiments, the glass articles may be flat, curved, or a combination of flat portions and curved portions, and the shape of the glass articles can be a product of hot forming or cold forming.

As used herein, the terms "cold-bent," "cold bending," "cold-formed" or "cold forming" refers to curving the glass substrate at a cold-form temperature, which is less than the glass transition temperature of the glass material of glass substrate.

As used herein, the presence or absence of "mura" is determined by a touch mura visibility factor ($\delta$) value that is defined by Equation (1), as follows.

$$\delta = \frac{(E - M)}{(E + M)} \qquad \text{Equation (1)}$$

Figure 9:
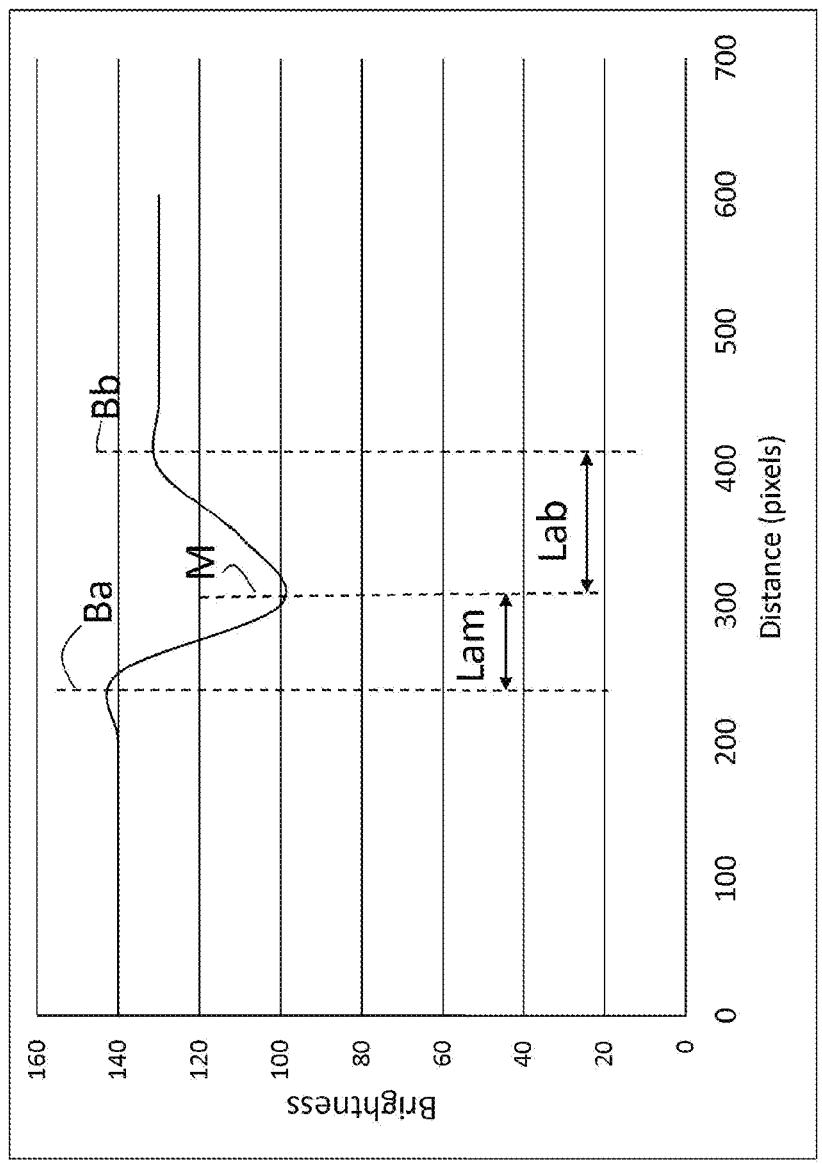
FIG. 9 is a graph illustrating the mura effect and various measurements used to calculate the touch mura visibility factor.

The value M is the minimum brightness value measured in the mura. The value B is calculated using Equation (2), using the measurements of Ba, Bb, Lam and Lab, which characterize the brightness at a mura across a dimension, as shown in FIG. 9. In FIG. 9, the measurements are taken along a length dimension, however, the measurements can be taken along a width dimension or across the largest dimension of a mura. The value Lab is a maximum distance of the mura (e.g., in FIG. 9, it is the distance from leftmost point to the rightmost point of the mura, in pixels). The value Lam is the distance between the starting point used to measure Lab (i.e., leftmost point of the mura) to the location of the value M.

$$B = Ba + (Bb - Ba) \times \left(\frac{Lam}{Lab}\right) \qquad \text{Equation (2)}$$

A touch mura visibility factor $\delta$ that is less than or equal to 0.5 (≤0.05) indicates there is no touch mura.

In typical processes, curved glass articles are formed using hot forming of the glass substrate to achieve desired shapes. As discussed herein a variety of curved glass articles and processes for making the same are provided that avoid the deficiencies of the typical glass hot-forming process. For example, hot-forming processes are energy intensive and increase the cost of forming a curved glass component, relative to the cold-bending process discussed herein. In addition, hot-forming processes typically make application of glass surface treatments, such as anti-reflective coatings, significantly more difficult. Thus, many coating materials cannot be applied to a flat piece of glass material prior to the hot-forming process because the coating material typically will not survive the high temperatures of the hot-forming process. Further, application of a coating material to surfaces of a curved glass substrate after hot-bending is substantially more difficult than application to a flat glass substrate. By avoiding the additional high temperature heating steps needed for thermal forming, the glass articles produced via the cold-forming processes and systems discussed herein have improved optical properties and/or improved surface properties than similarly shaped glass articles made via thermal-shaping processes. Nonetheless, as will be clear from the description herein, embodiments of this disclosure are applicable to both hot-formed and cold-formed glass articles.

With reference to FIG. 1, a vehicle interior 10 may include various components and systems having a glass surface, such as vehicle interior systems 100, 110, 120. Vehicle interior system 100 includes a frame, shown as center console base 102, with a curved surface 104 including a curved display 106. Vehicle interior system 110 includes a frame, shown as dashboard base 112, with a curved surface 114 including a curved display 116. The dashboard base 112 typically includes an instrument panel 118, which may also include a curved display. Vehicle interior system 120 includes a frame, shown as steering wheel base 122, with a curved surface 124 and a curved display 126. In one or more embodiments, the vehicle interior system includes a frame that is an arm rest, a structural pillar, a seat back, a floor board, a headrest, a door panel, or any portion of the interior of a vehicle that includes a curved surface. In other embodiments, the frame is a portion of a housing for a free-standing display (e.g., a display that is not permanently connected to a portion of the vehicle, or a display that is mounted apart from one of the surfaces or frames described above). While embodiments discussed herein may be discussed with reference to curved glass substrates, frames, surfaces, displays, etc., it is contemplated that embodiments include articles and vehicle interior systems having flat glass substrates, frames, surfaces, displays, touch panels, etc.

The embodiments of the vehicle interior systems described herein can be used in each of vehicle interior systems 100, 110 and 120. Further, the curved glass articles discussed herein may be used as curved cover glasses for any of the curved display embodiments discussed herein, including for use in vehicle interior systems 100, 110 and/or 120. Further, in various embodiments, various non-display components of vehicle interior systems 100, 110 and 120 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass substrate with adjacent non-glass components or for other design or aesthetic reasons. In specific embodiments, such ink or pigment coating may have a transparency level that provides for deadfront functionality.

Figure 2:
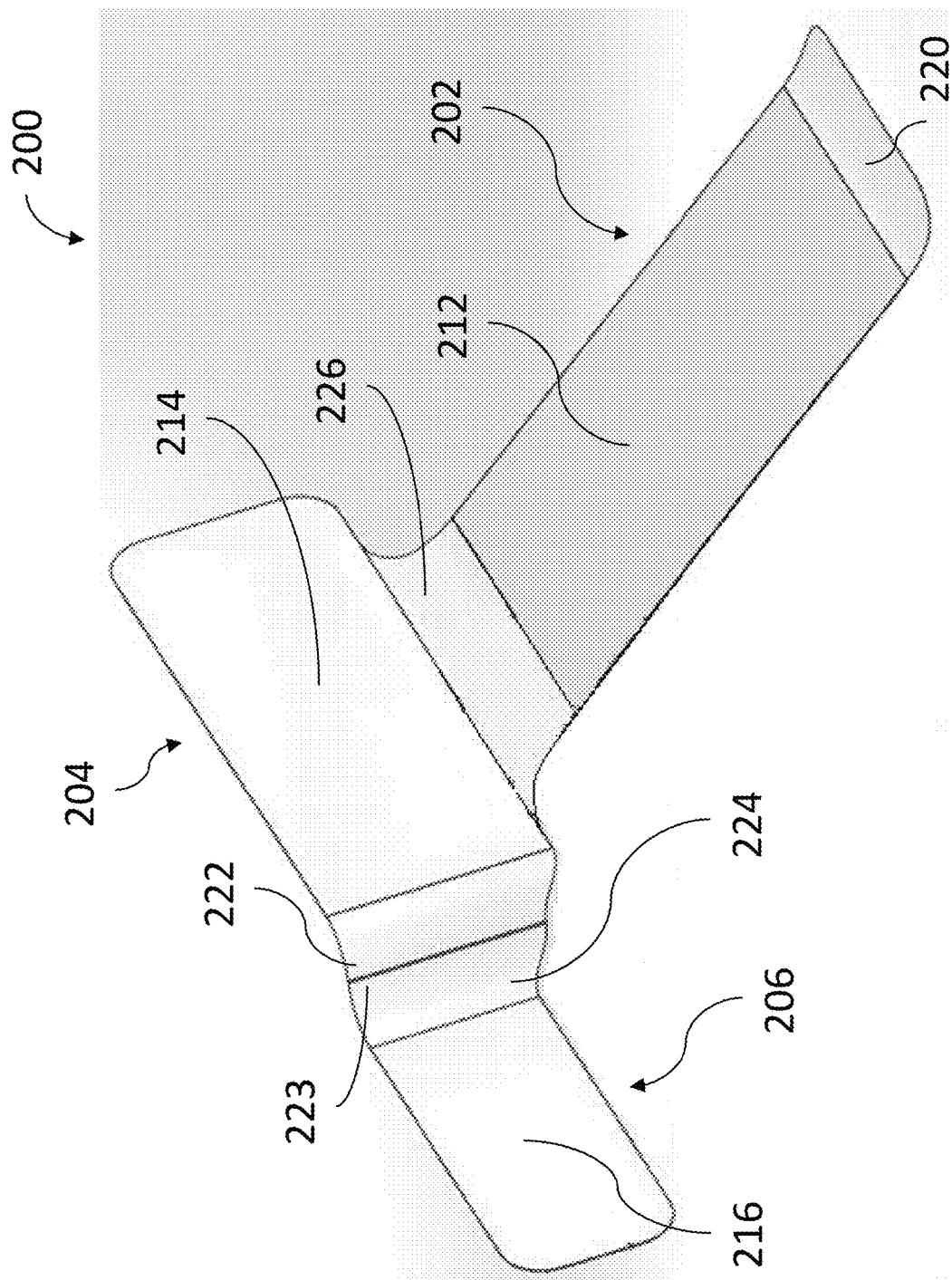
FIG. 2 is a perspective view of a glass article for a vehicle interior system, according to some embodiments.

FIG. 2 shows an example of a glass article 200 for some embodiments of vehicle interior systems of this disclosure. Specifically, the glass article 200 presents a unified glass surface, whether formed of a single glass substrate or multiple abutting glass substrates, in the vehicle interior. The glass article can thus form a center console 202, dashboard 204, and instrument panel 206, which can each include a display 212, 214, 216, respectively. The displays 206, 216, and 226 can include one or more touch panels or touch-sensitive regions. Connecting portions 220, 222, 224, and 226 border each of and/or connect the center console 202, dashboard, 204, and instrument panel 206. Each of the connecting portions 220, 222, 224, and 226 can be flat or curved. Curved portions can include simple curves with a single radius of curvature, a compound curve with a major radius of curvature and a cross curvature, or a reverse curve with two radii of curvature in different or opposite directions that meet at an inflection. For example, sections 222 and 224 show a reverse curve with the line 223 representing the inflection or meeting of the two curves.

Figure 3:
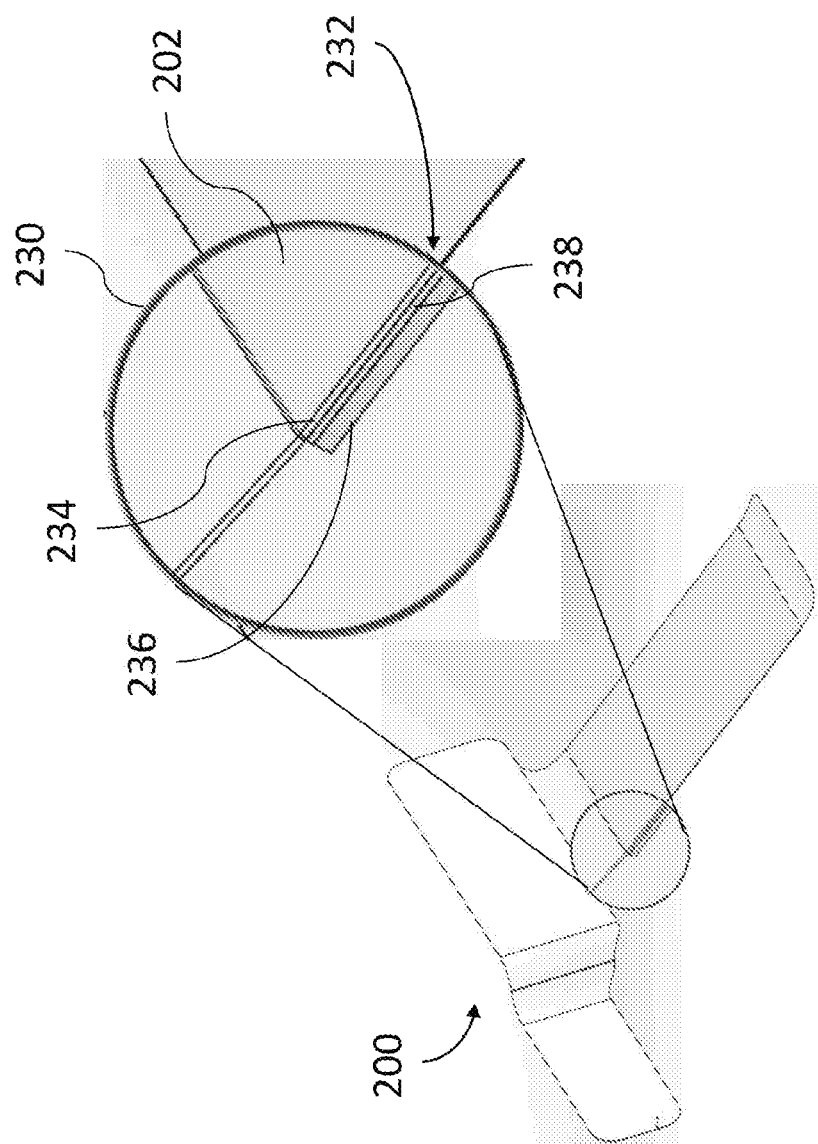
FIG. 3 is a magnified view of a portion of the glass article of FIG. 2, according to some embodiments.

FIG. 3 shows a magnified view 230 of a portion of the glass article 200 of FIG. 2, according to one or more embodiments. The magnified view 230 shows that the center console 202 portion of the glass article 200 includes a laminated portion 232 that includes a first glass substrate 234 and a second glass substrate 236, which are laminated to each other via an interlayer 238. Suitable materials for the interlayer 238 include polyvinyl butyral (PVB). In the case where the laminated portion 232 is part of a touch-enabled display, the second glass substrate 236 is provided underneath the first glass substrate 234, which functions as the touch surface for the user. Thus, the second glass substrate provides structural reinforcement for the thin first glass substrate 234 to reduce or effectively eliminate touch-induced mura in the display. Further details of this construction are discussed below.

Figure 4:
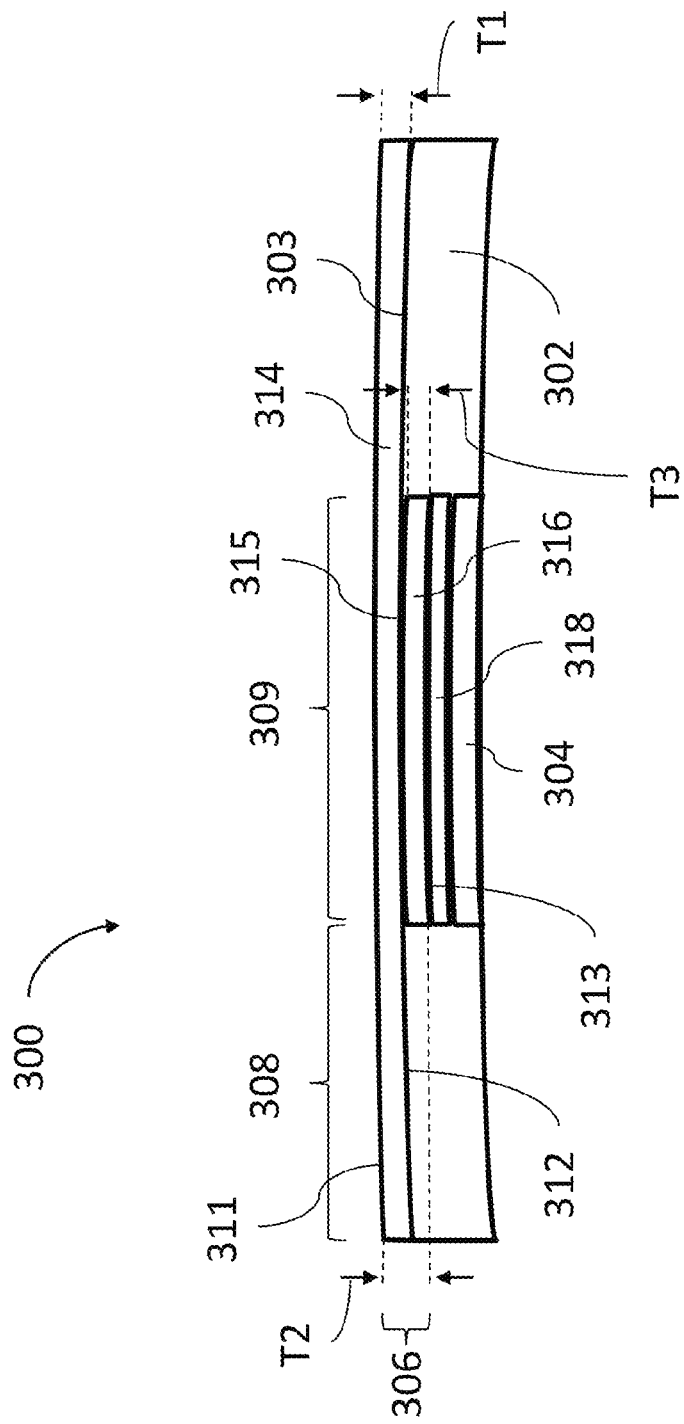
FIG. 4 is a cross-sectional view of a vehicle interior system, according to one or more embodiments.

FIG. 4 shows an example of a vehicle interior system 300 according to one or more embodiments. Referring to FIG. 4, the vehicle interior system 300 according to some embodiments of this disclosure includes a base or frame 302, a display 304 disposed on or coupled to the base 302, and a cover glass 306 disposed on the display 304. The base 302 provides a support surface 303 for supporting the cover glass, and may also provide a surface or retaining feature (not shown) for supporting the display 304. In embodiments, this support surface 303 is curved and the cover glass 306 is shaped or cold-formed to the match the curvature of the curved support surface. The cover glass 306 includes a first region 308 having a first major surface 311, a second major surface 312 opposite the first major surface 311, and a first thickness T1 defined as a distance between the first major surface 311 and the second major surface 312. In a finished state of the vehicle interior system, the first major surface 311 is the surface facing an interior of the vehicle (i.e., facing a user of the vehicle interior system or a driver/passenger of the vehicle). The cover glass 306 further includes a second region 309 comprising the first major surface 311, a third major surface 313 opposite the first major surface 311, and a second thickness T2 defined as a distance between the first major surface 311 and the third major surface 313, where the second thickness T2 is greater than the first thickness T1.

As shown in FIG. 4, the second region 309 of the cover glass 306 corresponds to the location of the display 304, or a touch-sensitive region of the display 304. The increased thickness (T2) of the second region 309 provides structural support or rigidity to the cover glass 306 when the second region is a touch-enabled surface of a display. However, the first region 308 maintains the relatively thin second thickness T1, which provides advantages that include, for example, allowing the first region 308 to be more easily curved or conformed to uneven surfaces of the base 302, and decreasing the overall weight of the cover glass 306. Embodiments are not limited to the second region 309 corresponding to a touch-enabled display. That is, it may be desirable from a design standpoint to use the reinforcement of the second region 309 for a non-touch-enabled display so that the display has minimal or no mura when touched or impacted by a user or other object. An interlayer or adhesive 318 is disposed between the display 304 and the cover glass 306. The adhesive 318 may be an optically clear adhesive (OCA), and may be a liquid adhesive that is cured or pressure sensitive adhesive (PSA) or tape, or both.

According to one or more embodiments, the cover glass 306 includes, in the second region 309, a first glass substrate 314, which has the first major surface 311, and a second glass substrate 316 having the third major surface 313. The second glass substrate 316 also has a fourth major surface 315 opposite to the third major surface 313 and facing the second major surface 312. The cover glass 306 also includes, in the first region 308, the first glass substrate 314 but not the second glass substrate 316. Thus, the first glass substrate 314 has a thickness of T1 and the second glass substrate 316 has a third thickness T3 defined as a distance between the third major surface 313 and the fourth major surface 315. The third thickness T3 is approximately equal to the difference between the second thickness T2 and the first thickness T1, minus any additional thickness from an interlayer disposed between the first and second glass substrates 314, 316. The second thickness T2 in one or more embodiments is greater than about 0.5 mm, greater than about 0.9 mm, greater than about 1.0 mm, greater than about 1.1 mm, or greater than about 1.5 mm. The first thickness T1 is about 1.1 mm or less, less than about 1.0 mm, less than about 0.7 mm, less than about 0.5 mm, less than about 0.3 mm, or about about 0.1 mm to about 0.3 mm. In one or more particular embodiments, the first thickness T1 is at least about 0.1 mm. Also, the second thickness T2 may be at least about 1.25 mm. The third thickness T3 may be about 1.1 mm or less, about 1.0 mm or less, about 0.7 mm or less, about 0.55 mm or less, about 0.5 mm or less, or about 0.3 mm or less. The third thickness T3 may be at least 0.1 mm.

For example, Applicants have found that an embodiment where the first glass substrate 314 having a first thickness T1 of 0.7 mm can be cold-formed onto a base 302 and second glass substrate 316 having a third thickness T3 of about 0.55 mm. Using an interlayer 318 that is an optically clear adhesive (OCA) with a thickness of about 0.25 mm to about 0.5 mm disposed on a curved LCD display (display 304) with a radius of curvature of about 700 mm, a vehicle interior system can be provided that exhibits dramatically reduced mura as compared to a cover glass of 0.7 mm or even thicker. These combinations of thicknesses also provide a vehicle interior system of sufficient structural integrity to satisfy regulatory requirements related to headform impact testing (HIT), which are designed to ensure safety of vehicle passengers whose heads might impact a surface of the vehicle interior system during a collision.

While it is possible to use a thicker cover glass of uniform thickness (e.g., about 1.1 mm) to reduce mura, there are disadvantages in cost, weight, and formability of the glass. For example, the rigidity of a glass substrate has a squared relationship to the thickness, so with increasing thickness, the rigidity increases dramatically and makes forming a curved surface increasingly difficult. In addition, it may be possible to decrease mura by increasing the thickness of the OCA, but doing so presents processing changes when applying the OCA to a curved display (i.e., it is difficult to apply evenly). As such, thin adhesive films may be used in place of liquid OCA on curved displays. The thin adhesive films may have a thickness, for example, of about 0.15 mm. However, the thin adhesive films do not reduce mura. Thus, the embodiments of this disclosure overcome these several technical problems.

One or both of the first and second glass substrates 314, 316 can include a strengthened glass material. In particular, the strengthened glass material may be chemically strengthened, such as by an ion-exchange process. In particular embodiments, the first glass substrate 314 is chemically strengthened, and the second glass substrate 316 may be unstrengthened or strengthened, including chemically strengthened. The chemically strengthened glass material may be an alkali aluminosilicate glass or an alkali boroaluminosilicate glass. The glass material may also include unstrengthened or strengthened soda lime glass. A thin polymer interlayer or adhesive may be disposed between the first and second glass substrates 314 and 316 to laminate them together. This interlayer may be a liquid adhesive that is subsequently cured or an adhesive film, for example.

The vehicle interior system 300 of FIG. 4 shows a slight degree of curvature across the base 302 and first and second regions 308, 309. According to various embodiments, one or both of the first glass substrate 314 and the second glass substrate 316 may be curved in the second region 309. Alternatively, the second region 309 may not be curved. In any case, the first glass substrate 314 may be curved in the first region 308 without regard to the curvature (flat or curved) of the second region 309. One or both of the first and second glass substrates 314 and 316 may be cold-formed to the display and/or base.

Figure 5:
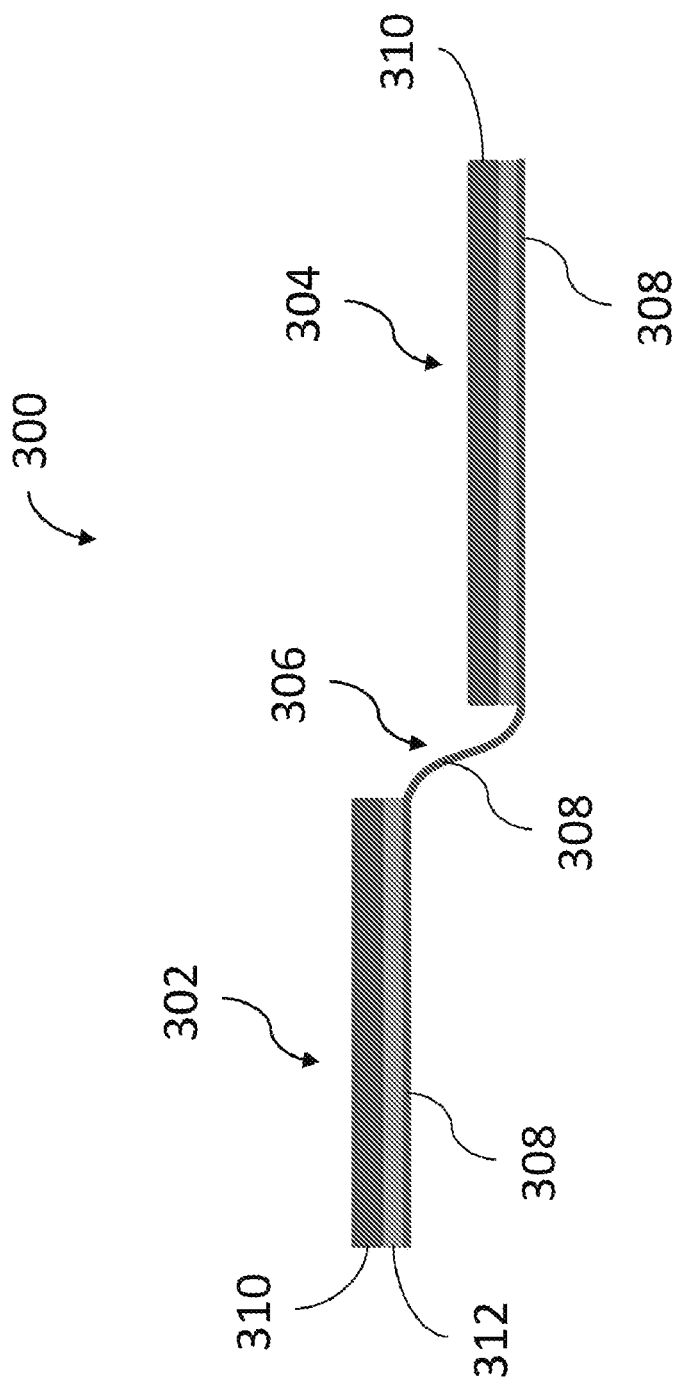
FIG. 5 is a cross-sectional view of a glass laminate for a vehicle interior system, according to some embodiments.

FIG. 5 shows an example of an embodiment of a cover glass 300 for a vehicle interior system with both curved and flat portions. The cover glass 300 includes two thick regions 302, 304 separated by a thin region 306. In this embodiment, the thick regions 302 and 304 are laminated glass regions each having a first glass substrate 308 and a second glass substrate 310 with an interlayer 312 therebetween, while the thin glass region contains only the first glass substrate 308. As discussed above, the thick regions 302, 304 may correspond to screens or touch panels of a vehicle interior system (e.g., displays 214 and 216 in FIG. 2). The relative thinness of the thin region 306 allows it to be easily curved to a desired curvature, including having complex or compound curvature. In addition, the curving can be accomplished via cold-forming of the first glass substrate 308.

In some embodiments, a cover glass for a vehicle interior system uses a monolithic glass substrate of varying thicknesses, rather than using regions of multiple laminated glass substrates. FIGS. 6A and 6B, for example, show a cover glass 320, which is similar to the cover glass 300 in FIG. 5, but is constructed from a single glass substrate 322. According to one or more embodiments, the glass substrate 322 is formed from a glass substrate having a uniform thickness, and that glass substrate is locally thinned in one or more regions. Specifically, the cover glass 320 has a first major surface 331 and a second major surface 332 corresponding to the major surfaces of the initial glass substrate of uniform thickness, $T_i$. A thinned region 334 is formed in a portion of the glass substrate 320 by any of a number of methods, including etching, grinding, polishing, or laser cutting, for example. A thickness of the thinned portion is less than $T_i$, and can have values corresponding to that of the thickness T1 discussed above. In some embodiments, the thinned portion can be ground to a thickness of about 0.2 mm, for example. The locally thinned region 334 creates a third major surface 333 opposite the first major surface 331. In FIG. 6A, the cover glass 320 is flat, but in FIG. 6B the cover glass 320 has been cold-formed such that the thinned region 334 is curved, resulting in a cold-formed cover glass 320'.

According to one or more embodiments, touch-induced mura can also be reduced by reinforcing the touch region of the display with a relatively thick interlayer between the cover glass and display/touch panel, or with an interlayer having a predetermined Young's modulus that reduces the mura effect. For example, an optical clear resin (OCR) with a thickness from about 500 μm to about 1000 μm can help suppress the touch-induced mura effect, while using a relatively thin (e.g., about 0.4 mm) cover glass that enables cold-forming and tight bending radii. In one or more embodiments, the Young's modulus for the interlayer may be in a range from about 10 KPa to about 200 KPa (e.g., from about 15 KPa to about 200 KPa, from about 20 KPa to about 200 KPa, from about 25 KPa to about 200 KPa, from about 30 KPa to about 200 KPa, from about 35 KPa to about 200 KPa, from about 40 KPa to about 200 KPa, from about 45 KPa to about 200 KPa, from about 50 KPa to about 200 KPa, from about 55 KPa to about 200 KPa, from about 60 KPa to about 200 KPa, from about 70 KPa to about 200 KPa, from about 75 KPa to about 200 KPa, from about 80 KPa to about 200 KPa, from about 85 KPa to about 200 KPa, from about 90 KPa to about 200 KPa, from about 95 KPa to about 200 KPa, from about 100 KPa to about 200 KPa, from about 120 KPa to about 200 KPa, from about 140 KPa to about 200 KPa, from about 150 KPa to about 200 KPa, from about 10 KPa to about 190 KPa, from about 10 KPa to about 180 KPa, from about 10 KPa to about 170 KPa, from about 10 KPa to about 160 KPa, from about 10 KPa to about 150 KPa, from about 10 KPa to about 140 KPa, from about 10 KPa to about 130 KPa, from about 10 KPa to about 120 KPa, from about 10 KPa to about 110 KPa, from about 10 KPa to about 100 KPa, from about 10 KPa to about 90 KPa, from about 10 KPa to about 80 KPa, from about 10 KPa to about 70 KPa, from about 10 KPa to about 60 KPa, from about 10 KPa to about 50 KPa, from about 10 KPa to about 40 KPa, or from about 10 KPa to about 30 KPa, and all ranges and sub-ranges therebetween).

In one or more embodiments, the interlayer may have a thickness in a range from about 125 μm to about 2000 μm, from about 150 μm to about 2000 μm, from about 725 μm to about 2000 μm, from about 200 μm to about 2000 μm, from about 225 μm to about 2000 μm, from about 250 μm to about 2000 μm, from about 275 μm to about 2000 μm, from about 300 μm to about 2000 μm, from about 325 μm to about 2000 μm, from about 350 μm to about 2000 μm, from about 375 μm to about 2000 μm, from about 400 μm to about 2000 μm, from about 425 μm to about 2000 μm, from about 450 μm to about 2000 μm, from about 475 μm to about 2000 μm, from about 500 μm to about 2000 μm, from about 550 μm to about 2000 μm, from about 600 μm to about 2000 μm, from about 650 μm to about 2000 μm, from about 700 μm to about 2000 μm, from about 750 μm to about 2000 μm, from about 800 μm to about 2000 μm, from about 850 μm to about 2000 μm, from about 900 μm to about 2000 μm, from about 950 μm to about 2000 μm, from about 1000 μm to about 2000 μm, from about 1250 μm to about 2000 μm, from about 1500 μm to about 2000 μm, from about 1750 μm to about 2000 μm, from about 125 μm to about 1900 μm, from about 125 μm to about 1800 μm, from about 125 μm to about 1700 μm, from about 125 μm to about 1600 μm, from about 125 μm to about 1500 μm, from about 125 μm to about 1400 μm, from about 125 μm to about 1300 μm, from about 125 μm to about 1200 μm, from about 125 μm to about 1100 μm, from about 125 μm to about 1000 μm, from about 125 μm to about 975 μm, from about 125 μm to about 950 μm, from about 125 μm to about 925 μm, from about 125 μm to about 900 μm, from about 125 μm to about 875 μm, from about 125 μm to about 850 μm, from about 125 μm to about 825 μm, from about 125 μm to about 800 μm, from about 125 μm to about 775 μm, from about 125 μm to about 750 μm, from about 125 μm to about 725 μm, from about 125 μm to about 700 μm, from about 125 μm to about 675 μm, from about 125 μm to about 650 μm, from about 125 μm to about 625 μm, from about 125 μm to about 600 μm, from about 125 μm to about 575 μm, from about 125 μm to about 550 μm, from about 125 μm to about 525 μm, from about 125 μm to about 500 μm, from about 125 μm to about 470 μm, from about 125 μm to about 450 μm, from about 125 μm to about 425 μm, from about 125 μm to about 300 μm, from about 125 μm to about 250 μm, or from about 250 μm to about 1000 μm, and all ranges and sub-ranges therebetween.

In addition, according to one or more embodiments, one or more optical fibers can be deposited in or one the interlayer (OCA) between the cover glass and the display/touch panel. The optical fiber runs parallel to a surface of the cover glass or display, and provides reinforcement to the touch-enabled area of the display. In addition, the optical fiber can be invisible to the human eye so optical performance and image clarity are not negatively impacted.

Referring to FIG. 4, in various embodiments, the first major surface 311 and/or the second major surface 312 or the third major surface 313 of glass substrate 306 may include one or more surface treatments or layers. Surface treatments may cover at least a portion of the first major surface 311 and/or second major surface 312 or third major surface 313. Exemplary surface treatments include anti-glare surfaces/coatings, anti-reflective surfaces/coatings, and a pigment design. In one or more embodiments, at least a portion of the first major surface 311 and/or the second major surface 312 or third major surface 313 may include any one, any two or all three of an anti-glare surface, an anti-reflective surface, and a pigment design. For example, first major surface 311 may include an anti-glare surface and second major surface 312 or third major surface 313 may include an anti-reflective surface. In another example, first major surface 311 includes an anti-reflective surface and second major surface 312 or third major surface 313 includes an anti-glare surface. In yet another example, first major surface 311 comprises either one of or both the anti-glare surface and the anti-reflective surface, and second major surface 312 or third major surface 313 includes the pigment design.

The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating.

In some embodiments, the glass substrate is bent to a curved shape on a curved mold surface via application of a force (e.g., via a vacuum chuck, electrostatic chuck, a press, etc.). For example, the curved mold surface can be a vacuum chuck or electrostatic chuck, or part a press, where the force to bend the glass substrate can be a pressure differential, an electrostatic force, or a force from contacting the press surface. While in the bent shape, an interlayer material, such as a polymer interlayer material or adhesive, can be provided onto the exposed surface of the glass substrate. In some embodiments, a frame having a curved support surface (e.g., corresponding to the curved shape of the curved mold surface) is then brought into contact with the glass substrate while in the bent shape, such that the interlayer material is disposed between the support surface and the glass substrate. A display module including a display, back light unit, and/or touch panel can be applied to the glass substrate with the interlayer between the display module and the glass substrate. In some cases, the display module may be attached to the frame before attaching to the glass substrate such that the frame and display module are attached simultaneously to the glass substrate in a curved state. Alternatively, the frame and display module can be attached to the glass substrate simultaneously in a flat state, and the entire stack of display module, frame, and glass substrate can be subsequently curved, as needed. In yet another alternative, the display module can be adhered to the glass substrate prior to attached in the frame, and the glass substrate and display module can be curved before attaching both to a curved frame. After the frame and interlayer material are applied to the cold-bent glass substrate, the interlayer material is solidified (e.g., via cooling, curing, or the like) to form a curved article.

As discussed above, the curvature of the cover glass may be the result of a flat glass substrate being cold-formed to a curved support surface of the frame, or the result of a flat glass-and-frame laminate being cold-bent to a curved shape. In general, a cover glass is cold-formed or cold-bent to the desired curved shape via application of a bending force. Following cold bending, the cover glass will have a curved shape such that the first major surface and second major surface each include at least one curved section having a radius of curvature. The support surface of the frame can be, for example, a convex curved surface. In such embodiments, the cover glass is bent such that second major surface and/or third major surface defines a concave shape that generally conforms to the convex curved shape of curved support surface, and the first major surface defines a convex shape that generally matches or mirrors the convex curved shape of curved support surface. In such embodiments, the major surfaces both define a first radius of curvature that generally matches the radius of curvature of the curved surface of the base. In some embodiments, is within about 10% of the radius of the curved support surface. In particular embodiments, a bonding material (or adhesive) and the rigidity of base holds the glass substrate in the curved shape following removal of bending force.

During application of the bending force, a maximum temperature of glass substrate is less than a glass transition temperature of the glass material of glass substrate. In a particular embodiment, the glass substrate is not actively heated via a heating element, furnace, oven, etc. during bending, as is the case when applying hot-forming glass to a curved shape. In various embodiments, the temperature of the glass substrate is maintained below 400 degrees C., 300 degrees C., 200 degrees C. or even 100 degrees C. during application of the bending force. This cold-bending approach allows for formation of a curved glass substrate while preserving various coatings located on the glass substrate that can be damaged or destroyed at high temperatures typically associated with glass bending processes.

In general, R1 is selected based on the shape of the associated vehicle interior frame, and in general R1 is between 20 mm and 5 m. In addition, the cover glass has a thickness t (e.g., an average thickness measured between major surfaces) that is in a range from 0.05 mm to 2 mm. In specific embodiments, t is less than or equal to 1.5 mm and in more specific embodiments, t is 0.3 mm to 0.7 mm. Such thin glass substrates can be cold formed to a variety of curved shapes (including the relatively high curvature radii of curvature discussed herein) utilizing cold forming without breakage while at the same time providing for a high-quality cover layer for a variety of vehicle interior applications. In addition, such a thin glass substrate may deform more readily, which could potentially compensate for shape mismatches and gaps that may exist relative to curved support surface.

The interlayer material between the display module and the glass substrate may be the same or different than the interlayer material between the frame and the glass substrate. For example, the interlayer material between the glass substrate and the display module and/or between the glass substrate and the frame can be one or more of an optically clear adhesive (OCA), polyvinyl brutyal (PVB), epoxy, a silicon material, an acrylic, a cyanoacrylate, a urethane, an epoxy acrylate, a structural adhesive, or any suitable interlayer material known in the art.

To laminate the first and second glass substrate of embodiments discussed herein, the first and second glass substrates may be laminated with a PVB interlayer therebetween. The resulting stack can be subjected to a vacuum environment to remove bubbles from the stack. The stack can then undergo a lamination cycle in an autoclave under sufficient time, pressure, and temperature to complete the lamination of the stack. The pressure of the autoclave may be up to about 15 bars, and the temperature may be up to about 250° C.

According to the embodiments of this disclosure, a vehicle interior system is provided that exhibits significantly reduced, or substantially no mura effect. That is, when a user of the vehicle interior system touches the vehicle interior surface (e.g., the first major surface 311 in FIG. 4) in the second region (309), the vehicle interior system does not exhibit mura. More particularly, the vehicle interior system does not exhibit mura when the touch panel registers such a touch by the user. For normal touch screen usage, the system may be designed to accommodate a touch force up to about 5 N or up to about 10 N, for example, although the force of a touch can vary and embodiments of this disclosure can be designed to accommodate for larger forces, as well. To determine the level of stress that must be sustained by the vehicle interior system while a touch is performed, modeling was conducted to determine the stress in the cover glass, as discussed in the following Examples.

EXAMPLES

Figure 7:
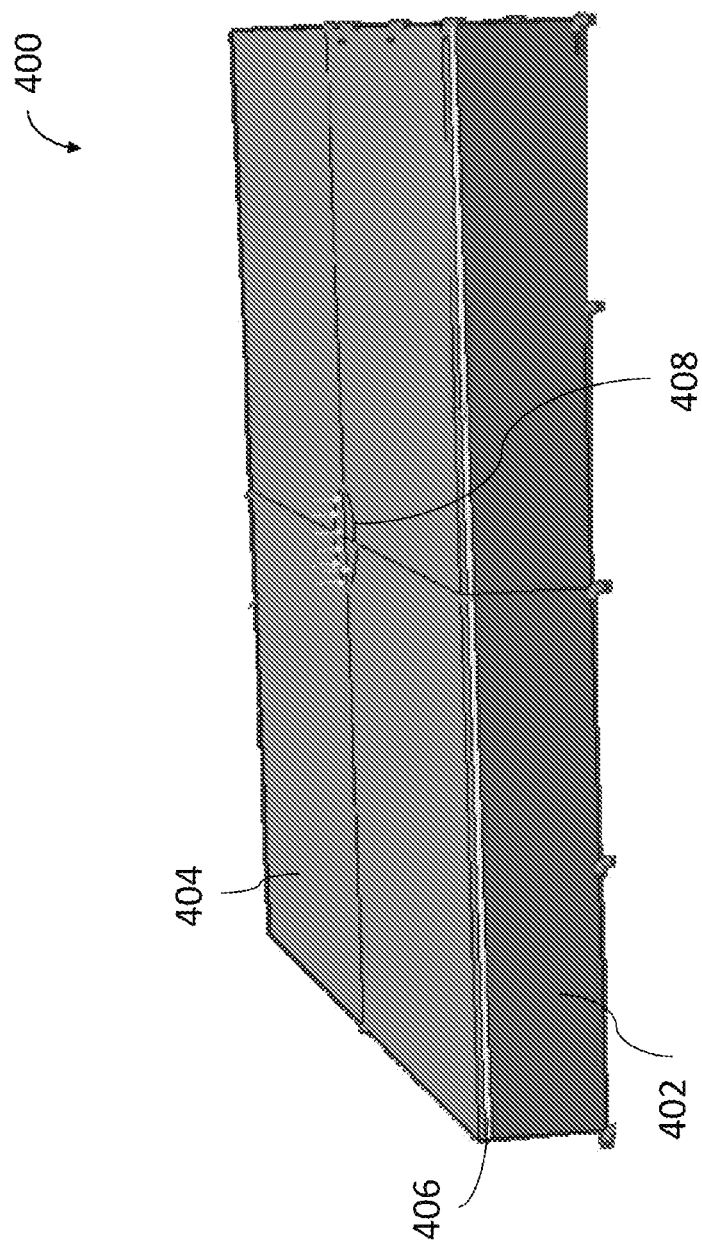
FIG. 7 is a perspective view of a model for modeling stress in a vehicle interior system, according to some embodiments.

FIG. 7 shows a computer model 400 of a vehicle interior system used to simulate a user touch and measure the induced stress in the system. The model 400 includes a base 402, a cover glass 404, and an interlayer 406 therebetween. A touch on the cover glass 404 was simulated on a circular area 408 having a diameter of 10 mm with a touch pressure of 63.7 KPa. The cover glass 404 was modeled as strengthened aluminosilicate glass substrate having a thickness of 0.40 mm, 0.55 mm, 0.70 mm, and 1.10 mm. The interlayer 406 was modeled as an optically clear adhesive having a Young's modulus of 10 KPa, 20 KPa, and 30 KPa, and a thickness of 0.125 mm, 0.25 mm, 0.3 mm, 0.4 mm, 0.5 mm, 0.6 mm, 1.0 mm, and 2.0 mm. The results of the stress induced by the touch are shown below in Table 1. Based on the modeling and results shown in Table 1, some embodiments of this disclosure are designed to experience a touch-induced stress of about 11.5 KPa or less, about 11 KPa or less, about 10 KPa or less, or about 9.6 KPa or less.

TABLE 1

Touch-Induced Stress Analysis.
Touch-induced Stress Analysis
[Pressure = 5N/(5 mm*5 mm*3.14) = 63.7 kPa]

| | | Glass substrate thickness | | | | | |
|---|---|---|---|---|---|---|---|
| | | 0.4 mm | | | 0.55 mm | | |
| | | OCA Young's Modulus (kPa) | | | | | |
| | | 10 | 20 | 30 | 10 | 20 | 30 |
| OCA | 0.125 | 12.4 | 16.8 | 21 | 12 | 18.8 | 22.3 |
| thickness | 0.25 | 10 | 15.3 | 18.5 | 9.6 | 13.5 | 16.1 |
| (mm) | 0.3 | 9.6 | 13.9 | 16.8 | 8.9 | 12.3 | 14.8 |
| | 0.4 | 8.6 | 11.8 | 14.4 | 7.5 | 10.3 | 12.6 |
| | 0.5 | 7.7 | 10.6 | 12.9 | 6.5 | 9.1 | 11.1 |
| | 0.6 | 7 | 9.7 | 11.9 | 5.9 | 8.3 | 10.12 |
| | 1 | 5.4 | 7.4 | 9.1 | 4.5 | 6.3 | 7.8 |
| | 2 | 3.7 | 5.1 | 6.2 | 3.1 | 4.4 | 5.4 |

| | | Glass substrate thickness | | | | | |
|---|---|---|---|---|---|---|---|
| | | 0.7 mm | | | 1.1 mm | | |
| | | OCA Young's Modulus (kPa) | | | | | |
| | | 10 | 20 | 30 | 10 | 20 | 30 |
| OCA | 0.125 | 11.2 | 17 | 20.4 | 10.4 | 13.5 | 15.9 |
| thickness | 0.25 | 8.84 | 12 | 14.3 | 7.1 | 9.6 | 11.5 |
| (mm) | 0.3 | 7.9 | 10.9 | 13.1 | 6.4 | 8.7 | 10.5 |
| | 0.4 | 6.7 | 9.3 | 11.3 | 5.4 | 7.5 | 9 |
| | 0.5 | 5.8 | 8.2 | 10 | 4.7 | 6.6 | 7.9 |
| | 0.6 | 5.2 | 7.4 | 9 | 4.2 | 6 | 7.3 |
| | 1 | 4 | 5.6 | 6.9 | 3.1 | 4.5 | 5.5 |
| | 2 | 2.7 | 3.9 | 4.8 | 2.1 | 3.1 | 3.8 |

Table 2 shows how thickness of the cover glass and OCA thickness impact the stress on the display and the liquid crystal displacement. The Young's modulus for the OCA in Table 2 was 86 KPa and the touch force was 10 N.

TABLE 2

Stress and Displacement based on Cover Glass and OCA thickness.

| Condition | Glass thickness | OCA thickness | Stress on Display | Displacement |
|---|---|---|---|---|
| Reference Point | 1.10 mm | 250 μm | 33.6 KPa | 122 μm |
| Condition A | 0.55 mm | 250 μm | 45.9 KPa | 167 μm |
| Condition B | 0.70 mm | 250 μm | 41.6 KPa | 152 μm |
| Condition C | 0.70 mm | 400 μm | 32.8 KPa | 190 μm |
| Condition D | 0.70 mm | 500 μm | 29.1 KPa | 210 μm |

Physical samples of 7-inch displays with cover glass were prepared having varying cover glass and OCA thicknesses, and the stress and liquid crystal displacement of the samples was measured. To simulate a user touch applied to a display, a load pin with a diameter of 10 mm and covered by soft rubber was used as the loading point or "finger". The load pin was applied to the surface of the cover glass at a load of 10 N and a test speed of 5 mm/minute. These samples are shown in FIG. 8A-8J as they experience a simulated touch, and the resulting mura effect is quantified by the change in uniformity of brightness measured at and around the touch location as function of displacement distance (in pixels) below each sample. Without being bound by theory, in some embodiments a touch mura visibility factor of less than or equal to 0.05 indicates no touch mura will be observed by a user.

Figure 8F:
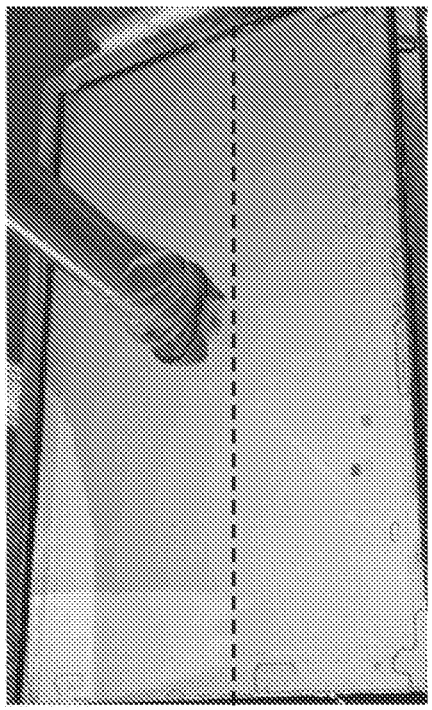
Figure 8F:
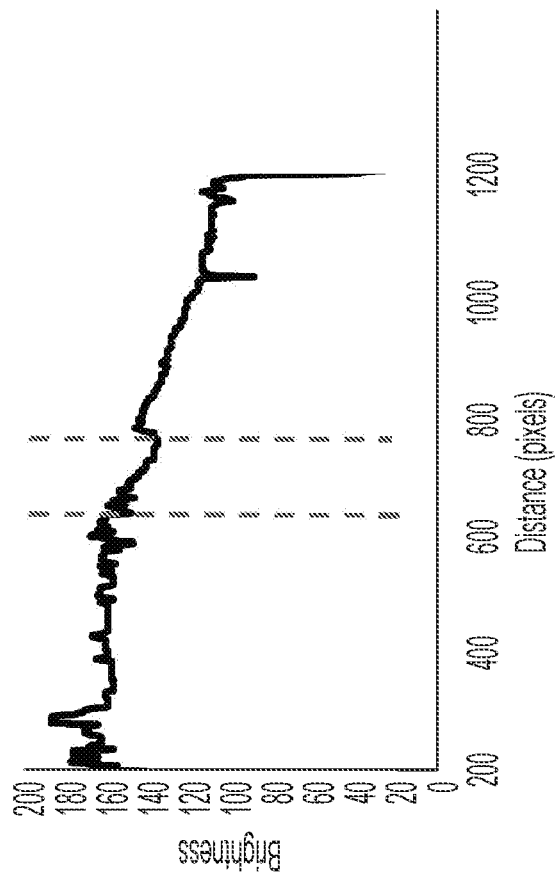
Figure 8E:
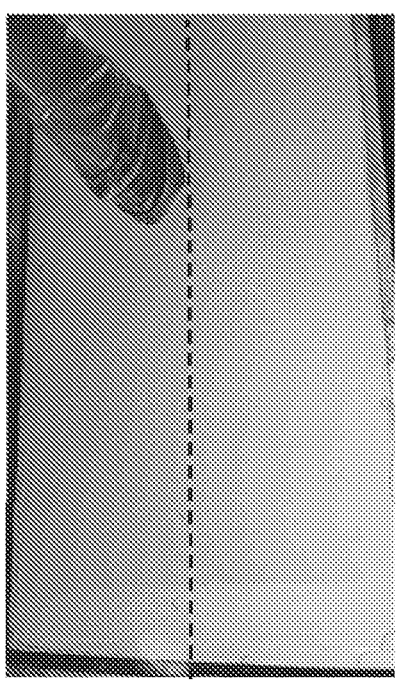
Figure 8E:
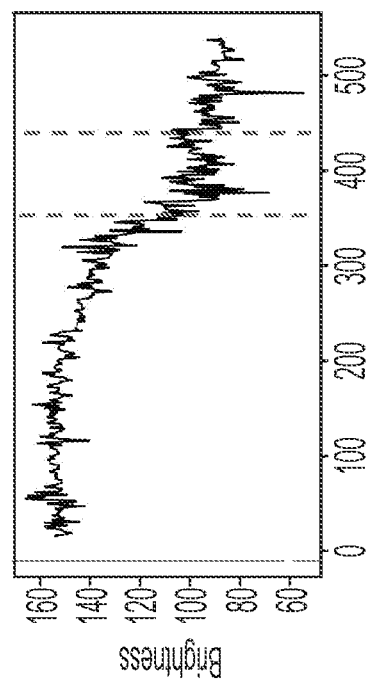
Figure 8G:
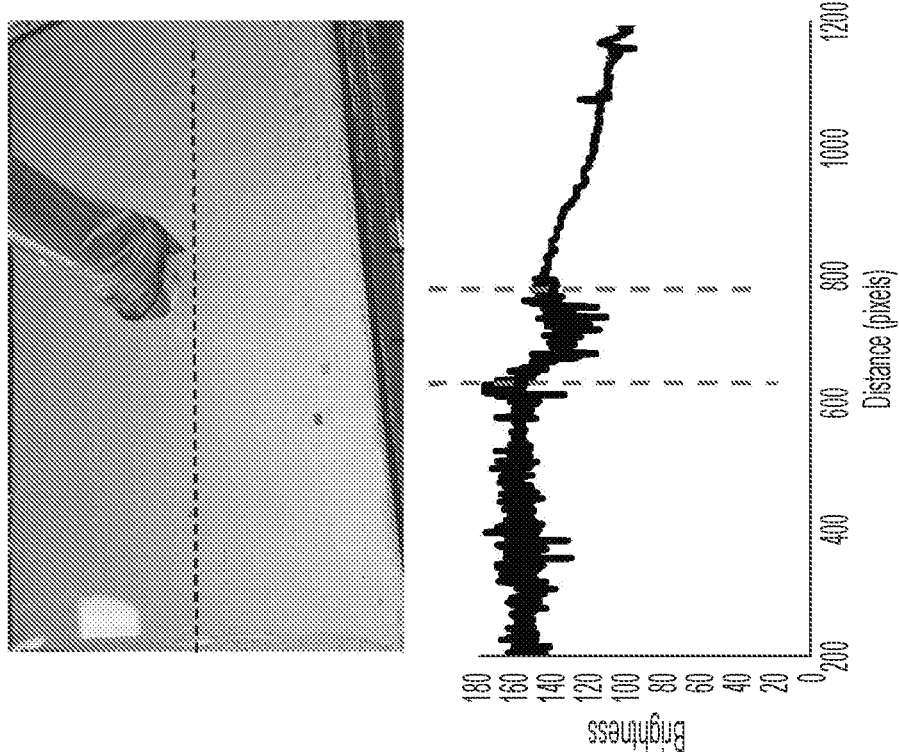
Figure 8H:
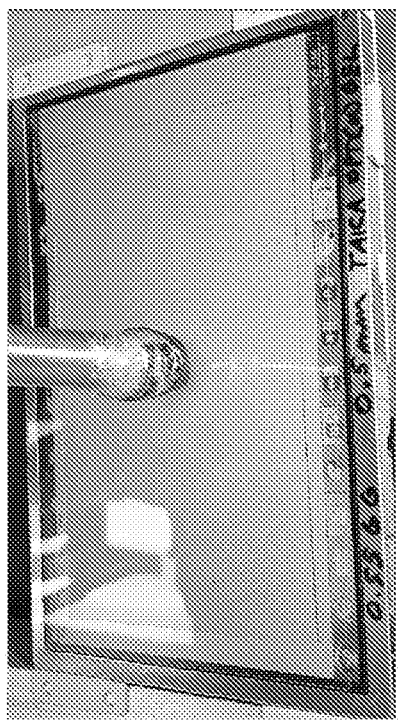
Figure 8H:
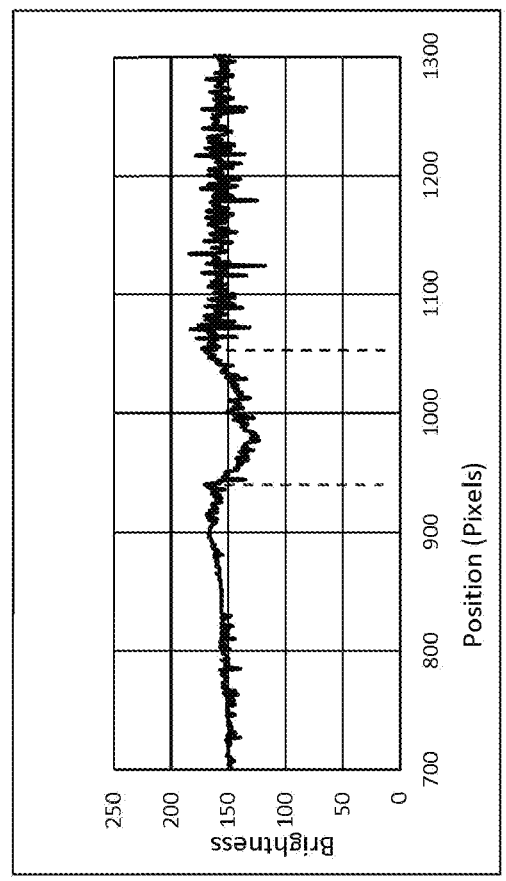
Figure 8I:
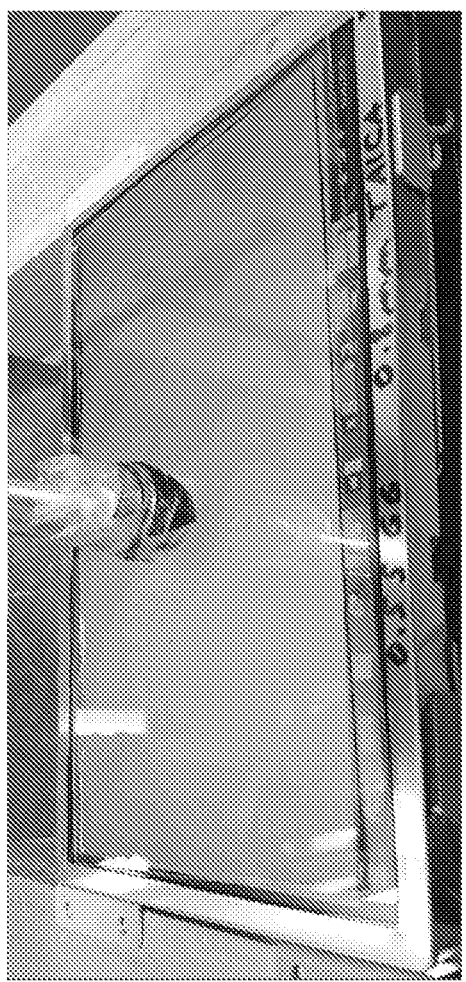
Figure 8I:
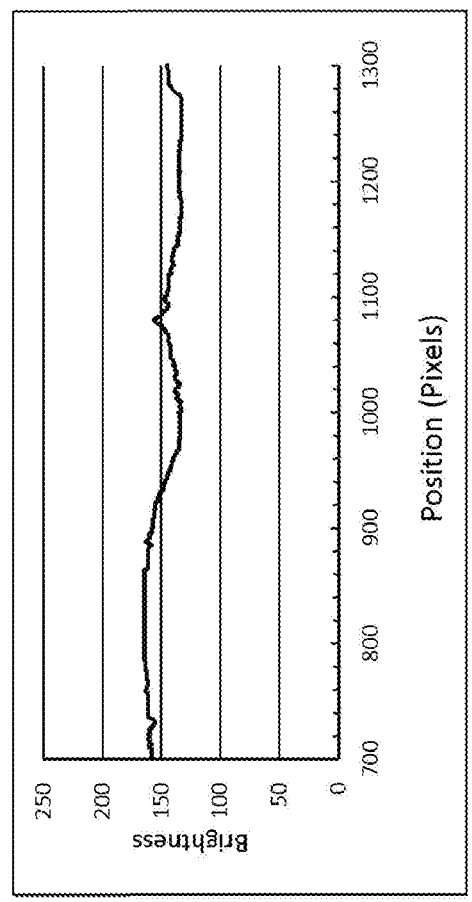
Figure 8J:
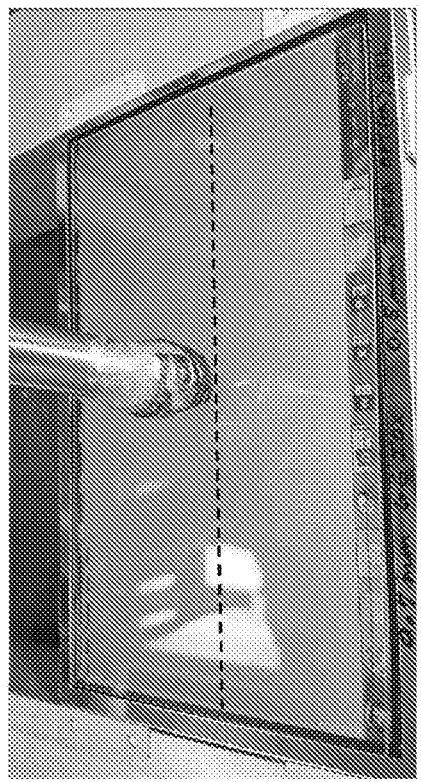
Figure 8J:
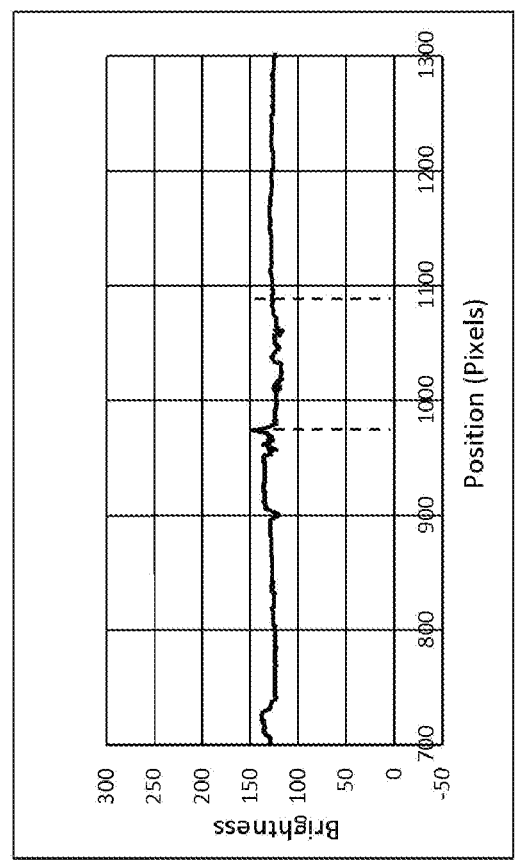

In FIG. 8A, the sample had a cover glass made of chemically strengthened aluminosilicate glass substrates with a thickness of 0.55 mm and a layer of OCA produced by E3 Displays, LLC having a Young's modulus of 30 KPa and with a thickness of 250 micrometers (μm). In FIG. 8B, the sample had a cover glass made of chemically strengthened aluminosilicate glass substrates with a thickness of 0.55 mm and a layer of the OCA produced by E3 Displays, LLC having a Young's modulus of 30 KPa and with a thickness of 500 μm. In FIG. 8C, the sample had a cover glass made of chemically strengthened aluminosilicate glass substrates with a thickness of 1.1 mm and a layer of OCA produced by E3 Displays, LLC having a Young's modulus of 30 KPa and with a thickness of 250 μm. In FIG. 8D, the sample had a cover glass made of chemically strengthened aluminosilicate glass substrates with a thickness of 0.55 mm and a layer of OCA produced by Henkel Corporation having a Young's modulus of 25 KPa and with a thickness of 250 μm. In FIG. 8E, the sample had a cover glass made of chemically strengthened aluminosilicate glass substrates with a thickness of 0.55 mm and a layer of OCA produced by Momentive Performance Materials Inc. having a Young's modulus of 15 KPa and with a thickness of 250 μm. In FIG. 8F, the sample had a cover glass made of chemically strengthened aluminosilicate glass substrates with a thickness of 0.55 mm and a layer of OCA produced by Momentive Performance Materials Inc. having a Young's modulus of 15 KPa and with a thickness of 1000 μm. In FIG. 8G, the sample had a cover glass made of chemically strengthened aluminosilicate glass substrates with a thickness of 0.55 mm and a layer of OCA produced by E3 Displays, LLC having a Young's modulus of 30 KPa with an plastic optical fiber mesh and with a thickness of 250 μmm. In FIG. 8H, the sample had a cover glass made of chemically strengthened aluminosilicate glass substrates with a thickness of 0.55 mm and a foam film layer of OCA produced by Taica under the trade name Opt(Alpha) Gel having a Young's modulus of 48 KPa with a thickness of 0.5 mm. In FIG. 8I, the sample had a cover glass made of chemically strengthened aluminosilicate glass substrates with a thickness of 0.55 mm and a foam film layer of OCA produced by Taica under the trade name Opt(Alpha) Gel having a Young's modulus of 48 KPa with a thickness of 0.8 mm. In FIG. 8J, the sample had a cover glass made of chemically strengthened aluminosilicate glass substrates with a thickness of 0.7 mm and a foam film layer of OCA produced by Taica under the trade name Opt(Alpha) Gel having a Young's modulus of 48 KPa with a thickness of 0.5 mm.

Many of the samples in FIGS. 8A-8J illustrate the impact of cover glass thickness, OCA thickness and softness or Young's modulus of the OCA on mura effect, as indicated by the decrease in brightness were the touch occurred. For example, comparing FIGS. 8A and 8B, the samples of which both use the same OCA material but of different thicknesses, the increased thickness of the OCA in FIG. 8B resulted in a reduced mura effect (i.e., less of a decrease in brightness were the touch occurred). FIG. 8C likewise uses the same OCA material and with the same thickness as FIG. 8A, but with a thicker cover glass (having a thickness of 1.1 mm) and shows relatively little mura effect due to the thicker cover glass. In the samples of FIGS. 8D and 8E, a softer OCA material is used (as noted above, the Henkel and Momentive OCAs have a lower Young's modulus than the E3 OCA). In the sample of FIG. 8F, the touch-induced mura effect is very small. The samples also show that the lower-Young's modulus OCA (from Momentive) results in a smaller decrease in brightness, and thus a reduced mura effect. This was predicted in the modeled results shown above in Table 1, where the lower Young's modulus OCA resulted in lower stresses. In FIG. 8G, the sample from FIG.

8E was altered to incorporate optical fiber into the OCA. FIG. 8E demonstrates that this alternative embodiment results in decreased mura, as well. To quantify the results, the touch mura visibility factor was also calculated for each of Examples 8A-8J and are shown in Table 3.

TABLE 3

Touch mura visibility factor (δ) for the examples of FIGS. 8A-8J.

| Figure | δ | Ba | Bb | M | Lab | Lam | B |
|---|---|---|---|---|---|---|---|
| FIG. 8A | 0.31 | 115.00 | 110.00 | 58.00 | 95.00 | 75.00 | 111.05 |
| FIG. 8B | 0.25 | 130.00 | 125.00 | 75.00 | 80.00 | 60.00 | 126.25 |
| FIG. 8C | 0.05 | 125.00 | 120.00 | 110.00 | 95.00 | 55.00 | 122.11 |
| FIG. 8D | 0.20 | 122.00 | 110.00 | 80.00 | 80.00 | 20.00 | 119.00 |
| FIG. 8E | 0.14 | 121.00 | 102.00 | 85.00 | 95.00 | 40.00 | 113.00 |
| FIG. 8F | 0.06 | 165.00 | 155.00 | 140.00 | 100.00 | 60.00 | 159.00 |
| FIG. 8G | 0.12 | 160.00 | 150.00 | 120.00 | 95.00 | 75.00 | 152.11 |
| FIG. 8H | 0.14 | 162.00 | 170.00 | 125.00 | 100.00 | 35.00 | 164.80 |
| FIG. 8I | 0.07 | 150.00 | 150.00 | 130.00 | 150.00 | 75.00 | 150.00 |
| FIG. 8J | 0.02 | 130.00 | 130.00 | 125.00 | 110.00 | 50.00 | 130.00 |

As shown in Table 3, the examples of FIGS. 8C and 8I exhibited a touch mura visibility factor of less than or equal to 0.05, indicating there is no or minimal mura effect.

The glass substrate according to one or more embodiments is formed from a strengthened glass sheet (e.g., a thermally strengthened glass material, a chemically strengthened glass sheet, etc.) In such embodiments, when the glass substrate is formed from a strengthened glass material, the first and second major surfaces are under compressive stress, and thus a major surface can experience greater tensile stress during bending to a convex shape without risking fracture. This allows for the strengthened glass substrate to conform to more tightly curved surfaces.

A feature of a cold-formed glass substrate is an asymmetric surface compressive between the first major surface and the second major surface once the glass substrate has been bent to the curved shape. In such embodiments, prior to the cold-forming process or being cold-formed, the respective compressive stresses in the first major surface and the second major surface of the glass substrate are substantially equal. After cold-forming, the compressive stress on a concave major surface increases such that the compressive stress on the major surface is greater after cold-forming than before cold-forming. In contrast, a convex major surface experiences tensile stresses during bending causing a net decrease in surface compressive stress on the surface, such that the compressive stress in the surface following bending is less than the compressive stress in the surface when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass substrates formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, etc.) are applied via deposition processes, such as sputtering processes that are typically ill-suited for coating curved glass articles. In addition, many surface treatments (e.g., anti-glare coatings, anti-reflective coatings, decorative coatings, etc.) also are not able to survive the high temperatures associated with hot-bending processes. Thus, in particular embodiments discussed herein, one or more surface treatments are applied to one or both of the major surfaces of the glass substrate prior to cold-bending, and the glass substrate including the surface treatment is bent to a curved shape as discussed herein. Thus, Applicant believes that the processes and systems discussed herein allow for bending of glass after one or more coating materials have been applied to the glass, in contrast to typical hot-forming processes.

Embodiments of this disclosure may also include decorative or functional coatings or films on various glass substrate surfaces. For example, an anti-splinter film may be disposed between a cover glass and an underlying base or frame, or one an inner or outer surface of a glass substrate in a monolithic or laminated cover glass article. A thickness of the anti-splinter film may be from about 250 μm to about 500 μm. The anti-splinter film itself may also have a mitigating effect on the touch-induced mura. In addition, the anti-splinter film can have the additional purpose of created a deadfront appearance on the display.

The articles and methods disclosed herein allow for a glass substrate to be bent into complex shapes having more than one radius of curvature. For example, the glass substrate can be bent to a shape such that one or both of the major surfaces have both convex and concave curved sections forming an S-shaped glass substrate when viewed in cross-section, as shown in FIG. 8.

In various embodiments, a cold-formed glass substrate may have a compound curve including a major radius and a cross curvature. A complexly curved cold-formed glass substrate may have a distinct radius of curvature in two independent directions. According to one or more embodiments, a complexly curved cold-formed glass substrate may thus be characterized as having "cross curvature," where the cold-formed glass substrate is curved along an axis (i.e., a first axis) that is parallel to a given dimension and also curved along an axis (i.e., a second axis) that is perpendicular to the same dimension. The curvature of the cold-formed glass substrate and the curved display can be even more complex when a significant minimum radius is combined with a significant cross curvature, and/or depth of bend. In various embodiments, a glass substrate can have more than two curved regions with the same or differing curved shapes. In some embodiments, the glass substrate can have one or more region having a curved shape with a variable radius of curvature.

In various embodiments, a thickness t of glass substrates used for one or two layers of the cover glass disclosed herein may be 2 mm or less and specifically is 0.3 mm to 1.1 mm. For example, the thickness t may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the thickness t falls within any one of the exact numerical ranges set forth in this paragraph.

A width W of a glass substrate is defined as a first maximum dimension of one of the first or second major surfaces orthogonal to the thickness t. In various embodiments, the width W is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm. In other embodiments, W falls within any one of the exact numerical ranges set forth in this paragraph.

A length L1 of a glass substrate is defined as a second maximum dimension of one of the first or second surfaces orthogonal to both the thickness t and the width W. In various embodiments, length L1 is in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm. In other embodiments, L1 falls within any one of the exact numerical ranges set forth in this paragraph.

In various embodiments, one or more radius of curvature of glass substrate 502 is about 20 mm or greater, about 40 mm or greater or about 60 mm or greater. For example, the first radius of curvature and/or the second radius of curvature may be in a range from about 20 mm to about 10,000 mm, from about 30 mm to about 10,000 mm, from about 40 mm to about 10,000 mm, from about 50 mm to about 10,000 mm, from about 60 mm to about 10,000 mm, from about 70 mm to about 10,000 mm, from about 80 mm to about 10,000 mm, from about 90 mm to about 10,000 mm, from about 100 mm to about 10,000 mm, from about 120 mm to about 10,000 mm, from about 140 mm to about 10,000 mm, from about 150 mm to about 10,000 mm, from about 160 mm to about 10,000 mm, from about 180 mm to about 10,000 mm, from about 200 mm to about 10,000 mm, from about 220 mm to about 10,000 mm, from about 240 mm to about 10,000 mm, from about 250 mm to about 10,000 mm, from about 260 mm to about 10,000 mm, from about 270 mm to about 10,000 mm, from about 280 mm to about 10,000 mm, from about 290 mm to about 10,000 mm, from about 300 mm to about 10,000 mm, from about 350 mm to about 10,000 mm, from about 400 mm to about 10,000 mm, from about 450 mm to about 10,000 mm, from about 500 mm to about 10,000 mm, from about 550 mm to about 10,000 mm, from about 600 mm to about 10,000 mm, from about 650 mm to about 10,000 mm, from about 700 mm to about 10,000 mm, from about 750 mm to about 10,000 mm, from about 800 mm to about 10,000 mm, from about 900 mm to about 10,000 mm, from about 950 mm to about 10,000 mm, from about 1000 mm to about 10,000 mm, from about 1250 mm to about 10,000 mm, from about 1500 mm to about 10,000 mm, from about 2000 mm to about 10,000 mm, from about 3000 mm to about 10,000 mm, from about 4000 mm to about 10,000 mm, from about 5000 mm to about 10,000 mm, from about 7250 mm to about 10,000 mm, from about 20 mm to about 9000 mm, from about 20 mm to about 8000 mm, from about 20 mm to about 7000 mm, from about 20 mm to about 6000 mm, from about 20 mm to about 5000 mm, from about 20 mm to about 4000 mm, from about 20 mm to about 3000 mm, from about 20 mm to about 2500 mm, from about 20 mm to about 2250 mm, from about 20 mm to about 2000 mm, from about 20 mm to about 1750 mm, from about 20 mm to about 1700 mm, from about 20 mm to about 1600 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, or from about 20 mm to about 250 mm. In other embodiments, first radius of curvature and/or second radius of curvature falls within any one of the exact numerical ranges set forth in this paragraph. In one or more embodiments, the first radius of curvature differs from the second radius of curvature. For example, the second radius of curvature may be greater than the first radius of curvature.

According to embodiments discussed herein, a glass substrate of a vehicle interior component can include one or more regions intended to show a display (e.g., an electronic display). In addition, a glass substrate according to some embodiments can be curved in multiple regions of the glass substrate and in multiple directions (i.e., the glass substrate can be curved about different axes that may or may not be parallel). Accordingly, shapes and forms of the possible embodiments are not limited to the examples shown herein. The glass substrate can be shaped to have a complex surface including multiple different shapes including one or more flat sections, one or more conical sections, one or more cylindrical sections, one or more spherical sections, etc.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, a glass substrate of the cover glass of some embodiments may be strengthened. In one or more embodiments, the glass substrate may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, the glass substrate may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In various embodiments, the glass substrate may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by a single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four-point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn, Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness t of the glass substrate (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, the DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in a glass substrate of a cover glass according to one or more embodiments1include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1. 5 mol % to about 6 mol %. Optionally, $SnO_2$ may be included in the amounts otherwise disclosed herein. It should be understood, that while the preceding glass composition paragraphs express approximate ranges, in other embodiments, glass substrate 134 may be made from any glass composition falling with any one of the exact numerical ranges discussed above.

Aspect (1) pertains to a vehicle interior system, comprising: a base comprising a curved surface; a display disposed on the curved surface; and a cover glass disposed on the display, the cover glass comprising: a first region comprising a first major surface, a second major surface opposite the first major surface, and a first thickness defined as a distance between the first major surface and the second major surface; and a second region comprising the first major surface, a third major surface opposite the first major surface, and a second thickness defined as a distance between the first major surface and the third major surface; and wherein the display is attached to the third major surface, the second region corresponding to a touch-sensitive region of the display, and wherein the second thickness is greater than the first thickness.

Aspect (2) pertains to the vehicle interior system of Aspect (1), wherein the cover glass further comprises, in the second region, a first glass substrate comprising the first major surface and a second glass substrate comprising the third major surface.

Aspect (3) pertains to the vehicle interior system of Aspect (2), wherein at least one of the first and second glass substrates is strengthened.

Aspect (4) pertains to the vehicle interior system of Aspect (2), wherein the cover glass comprises a polymer interlayer between the first and second glass substrates.

Aspect (5) pertains to the vehicle interior system of any one of Aspects (2) through (4), wherein the cover glass comprises, in the first region, the first glass substrate but not the second glass substrate.

Aspect (6) pertains to the vehicle interior system of any one of Aspects (1) through (5), wherein the second thickness is greater than 1.1 mm and the first thickness is about 1.1 mm or less.

Aspect (7) pertains to the vehicle interior system of any one of Aspects (1) through (6), wherein the first thickness is less than 1.0 mm, less than 0.7 mm, less than 0.5 mm, less than 0.3 mm, or about 0.1 mm to 0.3 mm.

Aspect (8) pertains to the vehicle interior system of Aspect (7), wherein the first thickness is at least about 0.1 mm.

Aspect (9) pertains to the vehicle interior system of any one of Aspects (1) through (8), wherein the second thickness is at least 1.25 mm.

Aspect (10) pertains to the vehicle interior system of any one of Aspects (2) through (9), the second glass substrate further comprises a fourth surface opposite the third major surface, and a third thickness defined as a distance between the third major surface and the fourth surface, wherein the third thickness is less than 1.1 mm, less than 1.0 mm, less than 0.7 mm, less than 0.5 mm, or less than 0.3 mm.

Aspect (11) pertains to the vehicle interior system of Aspect (10), wherein the third thickness is about 0.55 mm.

Aspect (12) pertains to the vehicle interior system of Aspect (11), wherein the first thickness is about 0.7 mm.

Aspect (13) pertains to the vehicle interior system of any one of Aspects (1) through (12), wherein the display module is curved.

Aspect (14) pertains to the vehicle interior system of Aspect (13), wherein at least one of the first and second glass substrates are curved in the second region.

Aspect (15) pertains to the vehicle interior system of Aspect (13), wherein the first region is curved.

Aspect (16) pertains to the vehicle interior system of Aspect (15), wherein the second region is not curved.

Aspect (17) pertains to the vehicle interior system of any one of Aspects (1) through (16), further comprising an adhesive layer between the cover glass and the display module.

Aspect (18) pertains to the vehicle interior system of Aspect (17), wherein the adhesive is an optically clear adhesive.

Aspect (19) pertains to the vehicle interior system of Aspect (17) or Aspect (18), wherein the adhesive is polyvinyl butyral (PVB).

Aspect (20) pertains to the vehicle interior system of any one of Aspects (17) through (19), wherein a thickness of the adhesive is less than about 1.0 mm, or less than about 0.5 mm.

Aspect (21) pertains to the vehicle interior system of Aspect (20), wherein the thickness of the adhesive is at least about 0.25 mm.

Aspect (22) pertains to the vehicle interior system of any one of Aspects (1) through (21), the cover glass is a cold-formed cover glass.

Aspect (23) pertains to the vehicle interior system of any one of Aspects (2) through (22), wherein at least one of the first glass substrate and the second glass substrate is a cold-formed glass substrate.

Aspect (24) pertains to the vehicle interior system of any one of Aspects (1) through (23), wherein the third major surface is conformed to the curved surface of the base.

Aspect (25) pertains to the vehicle interior system of any one of Aspects (1) through (24), wherein at least a portion of the second major surface is conformed to the curved surface of the base.

Aspect (26) pertains to the vehicle interior system of any one of Aspects (1) through (25), further comprising an anti-splinter film disposed between the cover glass and the base.

Aspect (27) pertains to the vehicle interior system of Aspect (26), wherein a thickness of the anti-splinter film is from about 250 μm to about 500 μm.

Aspect (28) pertains to the vehicle interior system of any one of Aspects (1) through (27), wherein the display module comprises a touch panel.

Aspect (29) pertains to the vehicle interior system of any one of Aspects (1) through (28), wherein, when a user of the vehicle interior system touches the first major surface in the second region, the vehicle interior system does not exhibit mura.

Aspect (30) pertains to the vehicle interior system of Aspect (28) or Aspect (29), wherein vehicle interior system does not exhibit mura when the touch panel registers a touch by a user on the first major surface.

Aspect (31) pertains to the vehicle interior system of any one of Aspects (1) through (31), wherein the vehicle interior system exhibits a touch mura visibility factor of less than or equal to 0.05, when the touch panel registers a touch by a user exerting a force on the first major surface of about 5 N or greater, or about 10 N or greater on the first major surface.

Aspect (32) pertains to the vehicle interior system of Aspect (31)

Aspect (33) pertains to the vehicle interior system of any one of Aspects (1) through (30), wherein the first major surface in the first region is curved and comprises a first radius of curvature.

Aspect (34) pertains to the vehicle interior system of any one of Aspects (1) through (31), wherein, wherein the first major surface in the second region is flat.

Aspect (35) pertains to the vehicle interior system of Aspect (33), wherein the first major surface in the second region is curved and comprises a second radius of curvature.

Aspect (36) pertains to the vehicle interior system of Aspect (35), wherein the second radius of curvature is greater than the first radius of curvature.

Aspect (37) pertains to the vehicle interior system of any one of Aspects (33) through (36), wherein the first radius of curvature is about 5 m or less.

Aspect (38) pertains to the vehicle interior system of any one of Aspects (1) through (37), wherein the cover glass is strengthened.

Aspect (39) pertains to the vehicle interior system of any one of Aspects (1) through (38), wherein the cover glass comprises an alkali aluminosilicate glass, an alkali boroaluminosilicate glass, or a soda lime glass.

Aspect (40) pertains to the vehicle interior system of any one of Aspects (1) through (39), the vehicle interior system further comprising at least one optical fiber disposed in the interlayer, the optical fiber extending parallel to the second major surface Aspect (41) pertains to the vehicle interior system of any one of Aspects (1) through (40), wherein the vehicle interior system is at least one of a dashboard, a center console, an instrument cluster, a display, an infotainment module, a steering wheel, a touch panel, and an interior door panel Aspect (42) pertains to a vehicle interior system, comprising: a display module comprising a display and a touch panel; a cover glass disposed on the display module, the cover glass comprising a first major surface, a second major surface opposite the first major surface and attached to the display module, and a first thickness defined as a distance between the first and second major surface; and an interlayer disposed between the display module and the cover glass, wherein the first major surface is curved, and wherein vehicle interior system does not exhibit mura when the touch panel registers a touch by a user on the first major surface.

Aspect (43) pertains to the vehicle interior system of Aspect (42), wherein the vehicle interior system exhibits a touch mura visibility factor of less than or equal to 0.05.

Aspect (44) pertains to the vehicle interior system of Aspect (42) or Aspect (43), wherein the touch by the user exerts a force on the first major surface of about 5 N or greater, or about 10 N or greater.

Aspect (45) pertains to the vehicle interior system of any one of Aspects (42) through (44), wherein a surface area of contact between the first major surface and the touch has a diameter of about 10 mm.

Aspect (46) pertains to the vehicle interior system of any one of Aspects (42) through (45), wherein the interlayer is an optically clear adhesive.

Aspect (47) pertains to the vehicle interior system of any one of Aspects (42) through (45), wherein the first thickness is about 2 mm or less, about 1.1 mm or less, about 0.7 mm or less, about 0.55 mm or less, or about 0.4 mm or less.

Aspect (48) pertains to the vehicle interior system of any one of Aspects (42) through (47), wherein the interlayer has a Young's modulus in a range from about 10 KPa to about 200 KPa.

Aspect (49) pertains to the vehicle interior system of any one of Aspects (40) through (48), wherein the interlayer has a thickness of from about 125 μm to about 2000 μm.

Aspect (450) pertains to the vehicle interior system of claim (49), wherein the thickness of the interlayer is about 250 μm, about 400 μm, or about 500 μm.

Aspect (51) pertains to the vehicle interior system of any one of Aspects (47) through (50), wherein the first thickness is about 0.4 mm or greater and the Young's modulus of the interlayer is about 10 KPa or greater, wherein the first thickness is about 0.55 mm or greaer and the Young's modulus of the interlayer is about 20 KPa or greater, wherein the first thickness is about 0.7 mm or greater and the elastic modulus of the interlayer is about 30 KPa or greater, or wherein the first thickness is about 1.1 mm and the elastic modulus of the interlayer is about 50 KPa or greater.

Aspect (52) pertains to the vehicle interior system of any one of Aspects (42) through (51), the vehicle interior system further comprising a mesh disposed in the interlayer, the mesh fiber extending parallel to the second major surface.

Aspect (53) pertains to the vehicle interior system of Aspect (52), wherein the mesh comprises an optical fiber that is disposed in a region corresponding to the touch panel.

Aspect (54) pertains to the vehicle interior system of any one of Aspects (42) through (53), wherein the cover glass is cold-formed to the display module.

Aspect (55) pertains to the vehicle interior system of any one of Aspects (42) through (54), wherein the cover glass comprises an alkali aluminosilicate glass, an alkali boroaluminosilicate glass, or a soda lime glass.

Aspect (56) pertains to the vehicle interior system of any one of Aspects (42) through (55), wherein the vehicle interior system is at least one of a dashboard, a center console, an instrument cluster, a display, an infotainment module, a steering wheel, a touch panel, and an interior door panel.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A vehicle interior system, comprising:
a base comprising a curved surface;
a display disposed on the curved surface; and
a cover glass disposed on the display, the cover glass comprising:
a first region comprising a first major surface, a second major surface opposite the first major surface, and a first thickness defined as a distance between the first major surface and the second major surface; and
a second region comprising the first major surface, a third major surface opposite the first major surface, and a second thickness defined as a distance between the first major surface and the third major surface; and
wherein the display is attached to the third major surface, the second region corresponding to a touch-sensitive region of the display,
wherein the second thickness is greater than the first thickness,
wherein the cover glass is curved in at least the first region,
wherein the first region comprises a reverse curve in which radii of curvature in different directions meet at an inflection line, the inflection line delineating a boundary between concave and convex curves of the first major surface where a curvature of the first major surface changes sign.

2. The vehicle interior system of claim 1, wherein the cover glass further comprises, in the second region, a first glass substrate comprising the first major surface and a second glass substrate comprising the third major surface.

3. The vehicle interior system of claim 2, wherein at least one of the first and second glass substrates is strengthened.

4. The vehicle interior system of claim 2, wherein the cover glass comprises a polymer interlayer between the first and second glass substrates.

5. The vehicle interior system of claim 2, wherein the cover glass comprises, in the first region, the first glass substrate but not the second glass substrate.

6. The vehicle interior system of claim 2, the second glass substrate further comprises a fourth surface opposite the third major surface, and a third thickness defined as a distance between the third major surface and the fourth surface,
wherein the third thickness is less than 1.1 mm,
wherein the display is attached to the third major surface by an optically clear adhesive,
wherein the optically clear adhesive comprises a thickness that is at least 0.25 mm and less than 1.0 mm,
wherein the second thickness is greater than or equal to 0.7 mm and less than or equal to 1.5 mm, the optically clear adhesive comprises a Young's modulus that is greater than or equal to 10 kPa and less than or equal to 48 kPa.

7. The vehicle interior system of claim 1, wherein the second thickness is greater than 1.1 mm and the first thickness is in a range from about 0.1 mm to about 1.1 mm.

8. The vehicle interior system of claim 1, wherein the display is curved.

9. The vehicle interior system of claim 1, wherein the cover glass is a cold-formed cover glass.

10. The vehicle interior system of claim 1, wherein, when a user of the vehicle interior system touches the first major surface in the second region, the vehicle interior system does not exhibit mura.

11. The vehicle interior system of claim 1, wherein the vehicle interior system exhibits a touch mura visibility factor of less than or equal to 0.05, when the touch panel registers a touch by a user exerting a force on the first major surface of about 5 N or greater.

12. The vehicle interior system of claim 11, wherein a surface area of contact between the first major surface and the touch has a diameter of about 10 mm.

13. The vehicle interior system of claim 1, wherein the cover glass is strengthened and comprises an alkali aluminosilicate glass, an alkali boroaluminosilicate glass, or a soda lime glass.

14. The vehicle interior system of claim 1, wherein the first thickness is about 0.1 mm to 0.3 mm.

15. The vehicle interior system of claim 1, wherein the second region is not curved.

16. The vehicle interior system of claim 1, wherein the first region is curved via cold-forming.

17. The vehicle interior system of claim 1, wherein the first region comprises a radius of curvature from 20 mm to 250 mm.

18. The vehicle interior system of claim 1, wherein the cover glass comprises two thick regions separated by the first region, wherein the second region is one of the two thick regions.

19. The vehicle interior system of claim 18, wherein each of the two thick regions are laminated glass regions where second glass substrates are laminated to the cover glass.

20. The vehicle interior system of claim 18, wherein the first region comprises a locally thinned region of the cover glass so that the cover glass is a monolithic glass substrate having a variable thickness.

* * * * *